US009817973B2

(12) United States Patent
Wu et al.

(10) Patent No.: US 9,817,973 B2
(45) Date of Patent: Nov. 14, 2017

(54) METHOD AND DEVICE FOR MONITORING VIRUS TREND ABNORMALITY

(71) Applicant: Tencent Technology (Shenzhen) Company Limited, Shenzhen Guangdong (CN)

(72) Inventors: Jiaxu Wu, Shenzhen Guangdong (CN); Tao Yu, Shenzhen Guangdong (CN)

(73) Assignee: TENCENT TECHNOLOGY (SHENZHEN) COMPANY LIMITED, SHENZHEN (CN)

( * ) Notice: Subject to any disclaimer, the term of this patent is extended or adjusted under 35 U.S.C. 154(b) by 167 days.

(21) Appl. No.: 14/178,825

(22) Filed: Feb. 12, 2014

(65) Prior Publication Data
US 2014/0189872 A1 Jul. 3, 2014

Related U.S. Application Data

(63) Continuation of application No. PCT/CN2013/073357, filed on Mar. 28, 2013.

(30) Foreign Application Priority Data

Apr. 9, 2012 (CN) .......................... 2012 1 0101792

(51) Int. Cl.
G06F 21/56 (2013.01)
H04L 29/06 (2006.01)
H04L 12/24 (2006.01)

(52) U.S. Cl.
CPC ............ G06F 21/561 (2013.01); G06F 21/56 (2013.01); G06F 21/566 (2013.01);
(Continued)

(58) Field of Classification Search
CPC ....... G06F 21/56; G06F 21/566; H04L 63/14; H04L 63/1425
See application file for complete search history.

(56) References Cited

U.S. PATENT DOCUMENTS 6,886,099 B1 * 4/2005 Smithson et al. .............. 726/24
7,936,682 B2 5/2011 Singh et al.
(Continued)

FOREIGN PATENT DOCUMENTS

CN 1848745 10/2006
EP 1 995 929 A2 11/2008
(Continued)

OTHER PUBLICATIONS

"Trend Indicator: Moving Average", 2011, 2 pages.*
Cheng et al., "SmartSiren: Virus Detection and Alert for Smartphones", 2007, pp. 258-271.*
International Search Report with English translation, dated Jul. 4, 2013, International Patent Application No. PCT/CN2013/073357, pp. 1-6, State Intellectual Property Office, Beijing, China.
(Continued)

*Primary Examiner* — Thaddeus Plecha

(57) ABSTRACT

A method and device for monitoring virus trend abnormality are provided which may enable timely and effective monitoring of computer viruses. The method may include measuring a frequency of hits of a virus being found and/or removed. The frequency may be used for calculating an M-day moving average value of the number of hits of the virus. Method may also involve calculating a standardized residual of the number of hits of the virus. When the standardized residual is larger than a first preset threshold, the time at which the virus was encounter the last may be identified as an abnormality point on a trendline of the virus.

12 Claims, 8 Drawing Sheets

(52) U.S. Cl.
CPC .......... *H04L 41/069* (2013.01); *H04L 41/142* (2013.01); *H04L 63/14* (2013.01); *H04L 63/1416* (2013.01); *H04L 63/1425* (2013.01)

(56) References Cited

U.S. PATENT DOCUMENTS

| | | |
|---|---|---|
| 8,112,801 B2 | 2/2012 | Abdel-Aziz et al. |
| 8,321,935 B1 * | 11/2012 | Chen et al. .................... 726/22 |
| 2003/0028546 A1 * | 2/2003 | Keller et al. .................. 707/100 |
| 2007/0234424 A1 * | 10/2007 | Bu ..................... H04L 63/1425 |
| | | 726/22 |
| 2007/0245420 A1 * | 10/2007 | Yong ..................... H04L 41/28 |
| | | 726/23 |

FOREIGN PATENT DOCUMENTS

| | | |
|---|---|---|
| JP | 2005-236863 A | 9/2005 |
| JP | 4156540 B2 | 9/2008 |
| JP | 2009-15427 | 1/2009 |
| JP | 4723466 B2 | 7/2011 |
| WO | WO 2009/083022 A1 | 7/2009 |

OTHER PUBLICATIONS

Office Action dated Aug. 20, 2015 for corresponding Chinese Application No. 201210101792.2, 8 pages.

\* cited by examiner

| | Summary of Hypothetical Tests | | | |
|---|---|---|---|---|
| | Original hypothesis | Test | Sig. | Decider |
| 1 | The distribution of D1000 is a normal distribution with a mean of -0.00 and a standard deviation of 1.00 | Single-sample Kolmogorov-Smirnov detect | | Original hypothesis reserved |
| 2 | The distribution of D1003 is a normal distribution with a mean of -0.00 and a standard deviation of 1.00 | Single-sample Kolmogorov-Smirnov detect | | Original hypothesis reserved |
| 3 | The distribution of D1021 is a normal distribution with a mean of -0.00 and a standard deviation of 1.00 | Single-sample Kolmogorov-Smirnov detect | | Original hypothesis reserved |
| 4 | The distribution of D1022 is a normal distribution with a mean of -0.00 and a standard deviation of Single-sample Kolmogorov-Smirnov detect 1.00 | Single-sample Kolmogorov-Smirnov detect | | Original hypothesis reserved |
| 5 | The distribution of D1026 is a normal distribution with a mean of -0.00 and a standard deviation of 1.00 | Single-sample Kolmogorov-Smirnov detect | | Original hypothesis reserved |
| 6 | The distribution of D1070 is a normal distribution with a mean of -0.00 and a standard deviation of 1.00 | Single-sample Kolmogorov-Smirnov detect | | Original hypothesis reserved |
| 7 | The distribution of D100000 is a normal distribution with a mean of -0.00 and a standard deviation of 1.00 | Single-sample Kolmogorov-Smirnov detect | | Original hypothesis reserved |
| 8 | The distribution of D400000 is a normal distribution with a mean of -0.00 and a standard deviation of 1.00 | Single-sample Kolmogorov-Smirnov detect | | Original hypothesis reserved |
| 9 | The distribution of D400014 is a normal distribution with a mean of -0.00 and a standard deviation of 1.00 | Single-sample Kolmogorov-Smirnov detect | | Original hypothesis reserved |
| 10 | The distribution of D500003 is a normal distribution with a mean of -0.00 and a standard deviation of 1.00 | Single-sample Kolmogorov-Smirnov detect | | Original hypothesis reserved |
| | Indicate a progressive significance, the significance level of 0.05 | | | |

Fig.9

METHOD AND DEVICE FOR MONITORING VIRUS TREND ABNORMALITY

This application is a continuation application of PCT international application PCT/CN2013/073357, filed on Mar. 28, 2013, which claims the priority of Chinese Patent Application No. 201210101792.2, entitled "METHOD AND DEVICE FOR MONITORING VIRUS TREND ABNORMALITY", filed with the Chinese Patent Office on Apr. 9, 2012, both of which are incorporated herein by reference in their entirety.

FIELD OF THE INVENTION

The present invention relates to the field of computer technologies, and in particular to a method and device for detecting a virus trend abnormality.

BACKGROUND OF THE INVENTION

Typically, computer viruses may be periodically scanned for and terminated by an antivirus engine or application. Such actions may inhibit the viruses from growing to or beyond a certain extent. When the ability of the antivirus engine to scan for and terminate a type of virus substantially deviates from an original trend in a very short period, it may indicate the possible presence of the following abnormal conditions: in the case of a dramatically increased amount of this type of virus being found and terminated, may indicate that this type of virus is likely to break out on a large scale in a short period; and in the case of a dramatically decreased amount of this type of virus being found and terminated, may indicate that the ability of the antivirus engine to identify this type of virus might have been degraded and even invalidated or that this type of virus might have been mutated. In order to prevent the virus from breaking out on a large scale, it is of great significance to effectively monitor a development trend of the virus to identify such an abnormality and further to issue a timely alarm upon detection of the abnormality in the development trend of the virus.

In general, when there are a few types of viruses, a technician may subjectively determine whether the development trends of the viruses are abnormal as per his experience. However, with a dramatically increased number, e.g., tens of hundreds, of types of viruses, manual monitoring of the development trends of the viruses for an abnormality may consume considerable labor and further may not be effective.

Accordingly a method to detect a developing trend of a virus may be based upon the number of virus samples or based on an increase in number of virus samples. In this method, a corresponding threshold may be set for each virus, and whether the development trend of the virus is abnormal is determined by monitoring whether the number of virus samples exceeds the threshold or by monitoring whether an increase in number of virus samples exceeds the threshold. However, a new virus or a mutated virus may not be detected effectively in a timely manner.

SUMMARY OF THE INVENTION

The present disclosure describes embodiments of a method and device for detecting a virus trend abnormality so as to detect various types of viruses effectively in a timely manner.

In order to attain the foregoing objective, the embodiments adopt the following technical solutions.

In an aspect, a method for detecting a virus trend abnormality is provided. The method may include determining and storing a count of hits of a virus during an execution of an anti-virus operation. The method may further include calculating moving average values of the counts of hits of the virus for a predetermined number of days. If the predetermined number of days is M, calculating the moving average values may comprise performing an M-day moving average operation on the respective counts of hits of the virus to obtain respective M-day moving average values. Further, standardized residuals corresponding to the respective counts of hits of the virus may be calculated based on the calculated moving average values. A time point of occurrence of a particular count of hits may be identified as an abnormality point on a trend of the virus, if a standardized residual corresponding to the particular count of hits is larger than a first preset threshold.

In another aspect, there is provided a device for detecting an abnormality in a virus trend. The device may include an obtaining module to monitor a count of hits for a virus during an execution of an anti-virus operation over a period of time. An operating module of the device may calculate moving average values of over a predetermined number of days based on the respective counts of hits of the virus. The operating module may further calculate standardized residuals of the respective counts of hits of the virus with respect to the corresponding moving average values. The device may also include an identifying module that may identify an abnormality point in the virus trend at a point in time when the count of hits of the virus occurs such that a standardized residual corresponding to the count of hits is larger than a first preset threshold.

For example, using the embodiments described earlier, a 7-day moving average operation may be performed on the respective counts of hits of the virus to obtain the respective 7-day moving average values. The standardized residuals of the respective counts of hits of the virus with respect to their corresponding 7-day moving average values may be calculated. Since the respective standardized residuals calculated in connection with the 7-day moving average operation generally comply with a normal distribution, a confidence interval may be used to accurately determine whether a count of hit, each time the virus is scanned for and terminated, is abnormal and further to determine whether the trend of the virus is abnormal. For example, the first preset threshold may be set to 1.96 corresponding to the confidence interval of 95%. Using the first preset threshold, a time point of occurrence of a count of hit corresponding to a standardized residual may be identified as an abnormality point in the development trend of the virus when the standardized residual becomes larger than the first preset threshold.

As will be apparent from the described embodiments, when the trend of the virus is monitored for an abnormality, the first preset threshold may be determined for different confidence intervals. The first preset threshold may be determined without a large amount of historical data, so a new virus and a mutated virus may also be detected accurately. Moreover, each time the latest count of hits when the virus is scanned for and terminated is obtained, such determination may be made using the method. In this way, the calculated standardized residual of the latest count of hits of the virus with respect to the corresponding 7-day moving average value being larger than the first preset threshold, may indicate that the latest count of hits of the virus is abnormal, and thus various types of viruses may be detected effectively in a timely manner.

BRIEF DESCRIPTION OF THE DRAWINGS

In order to describe more clearly the technical solutions in the embodiments presented, the drawings to be used in the description of the embodiments or the prior art will be described briefly. The drawings are only some embodiments, and those ordinarily skilled in the art can derive from these drawings other drawings without any inventive effort. In the drawings:

FIG. 9 is a schematic diagram where standardized residuals calculated in the method according to an embodiment are verified for compliance with a normal distribution;

DETAILED DESCRIPTION OF THE INVENTION

Figure 1:
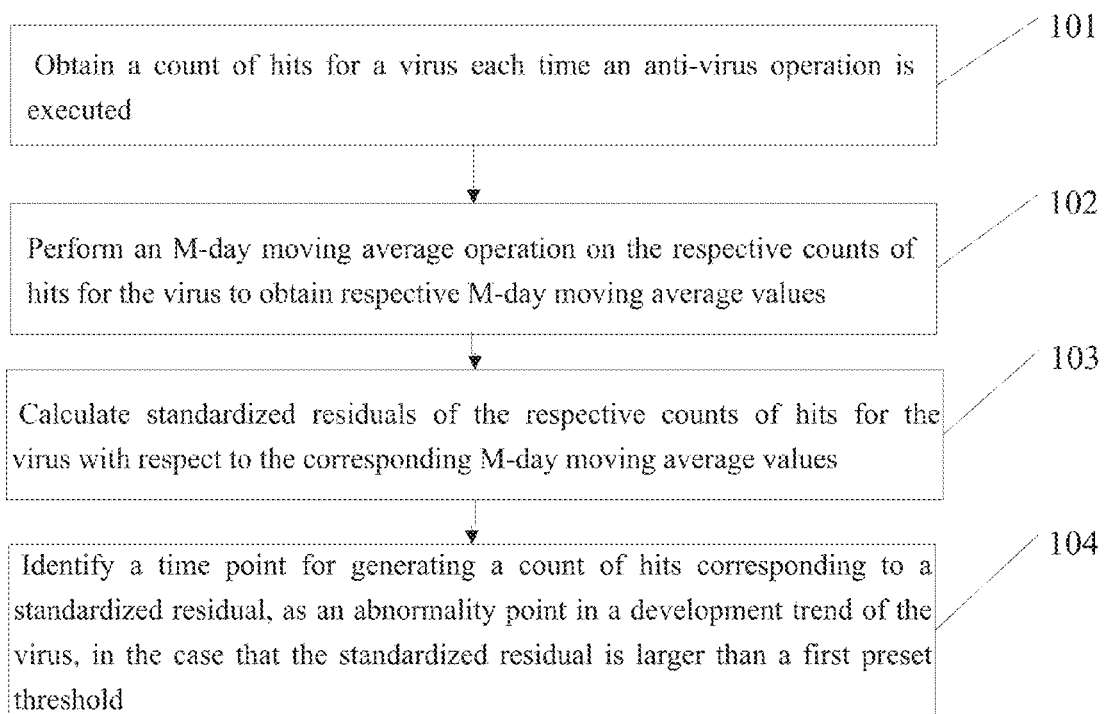
FIG. 1 is a flow chart of a method for detecting a virus trend abnormality according to a first embodiment.

It is to be understood that the following description of examples of implementations are given only for the purpose of illustration and are not to be taken in a limiting sense. The partitioning of examples in function blocks, modules or units shown in the drawings is not to be construed as indicating that these function blocks, modules or units are necessarily implemented as physically separate units. Functional blocks, modules or units shown or described may be implemented as separate units, circuits, chips, functions, modules, or circuit elements. Alternatively, or in addition, one or more functional blocks or units may also be implemented in a common circuit, chip, circuit element or unit.

With viruses being periodically scanned for and killed by antivirus engines, different types of viruses may be scanned for and killed by the different antivirus engines. For each type of virus including a known existing virus, a mutated virus or a new virus, a development trend of the type of virus may be monitored using the following method for detecting a virus trend abnormality. The method is described below using one type of virus as an example.

As illustrated in FIG. 1, a method for detecting a virus trend abnormality according to an embodiment may include steps 101-104.

The step 101 may obtain a count of hits each time a virus is scanned for and terminated. A hit of a virus may indicate an instance when the virus is encountered by an anti-virus engine. The hit may occur, for example, when the anti-virus engine is performing a scan operation. The count of hits of a virus indicates a number of times the virus was encountered by the anti-virus engine during the operation. The anti-virus engine may terminate the virus when encountered, or may perform any other operation, such as quarantine, as per user preferences. Terminating a virus may involve deleting a file that may be infected by the virus. Alternatively, or in addition, terminating a virus may involve cleaning and restoring contents of the infected file to a state without modifications that may have been made by the virus.

The respective counts of hits for the virus may be stored in a database in an order from the earliest time to the latest time a virus engine scanned and terminated the virus. The respective counts of hits of the virus may be stored in the format of "virus engine ID-virus ID-date-time of day-count of hits". Fewer or additional fields of information may be stored. The order of the fields may be repositioned.

For example, say, a virus B is scanned for and terminated by a virus engine A at 12:08 on Feb. 21, 2012, and the latest count of hits for the virus B is 3354. There may be N previous records of the counts of hits of virus B. The previous N counts of hits may be stored in a chronological order from the earliest scanning and terminating time to the latest time. The latest count of hits, i.e. the present record, for the virus B may be referred to as the (N+1)-th record. At this time, the (N+1)-th count of hits for the virus B may be stored in the format of "virus engine A-virus B-Feb. 21, 2012-12:08-3354" in the database following an entry with the N-th count of hits which would have been the last time the virus engine A scanned and terminated the virus B.

The trend of the virus may be monitored by retrieving from the database the respective counts of hits each time the virus is scanned for and terminated in a specific period of time or the respective counts of hits each time the virus is scanned for and terminated in all the periods.

Alternatively, or in addition, in an embodiment, in order to monitor the trend of the virus in a timely and effective manner, the last (N+1) counts of hits for the virus may be retrieved from the database, where the (N+1)-th count of hit represents a count of hits the last time the virus was scanned for and/or terminated. N may be a positive integer larger than 90.

The step 102 may involve performing an M-day (e.g., 7-day) moving average operation on the respective counts of hits of the virus to obtain respective M-day moving average values, where M is a positive integer. An embodiment is described below, with M=7 as an example. M is not limited to 7 and M may alternatively take any value such as 4, 5, 6, 8, 9, 10, 11, etc.

The respective M-day moving average values may be calculated as $$B_i = \frac{1}{M}\sum_{j=0}^{M} A_{i-j},$$

where $B_i$ is the M-day moving average value calculated from the i-th count of hits to the (i-M+1)-th count of hits for the virus, i∈[M ... N+1] and i is a positive integer. Further, N+1 is the total number of times the count of hits of a virus has been determined and/or stored, and $A_{i-j}$ is the (i-j)-th count of hits for the virus.

The step 103 may involve calculation of the standardized residuals of the respective counts of hits for the virus with respect to their corresponding M-day moving average values.

Figure 2:
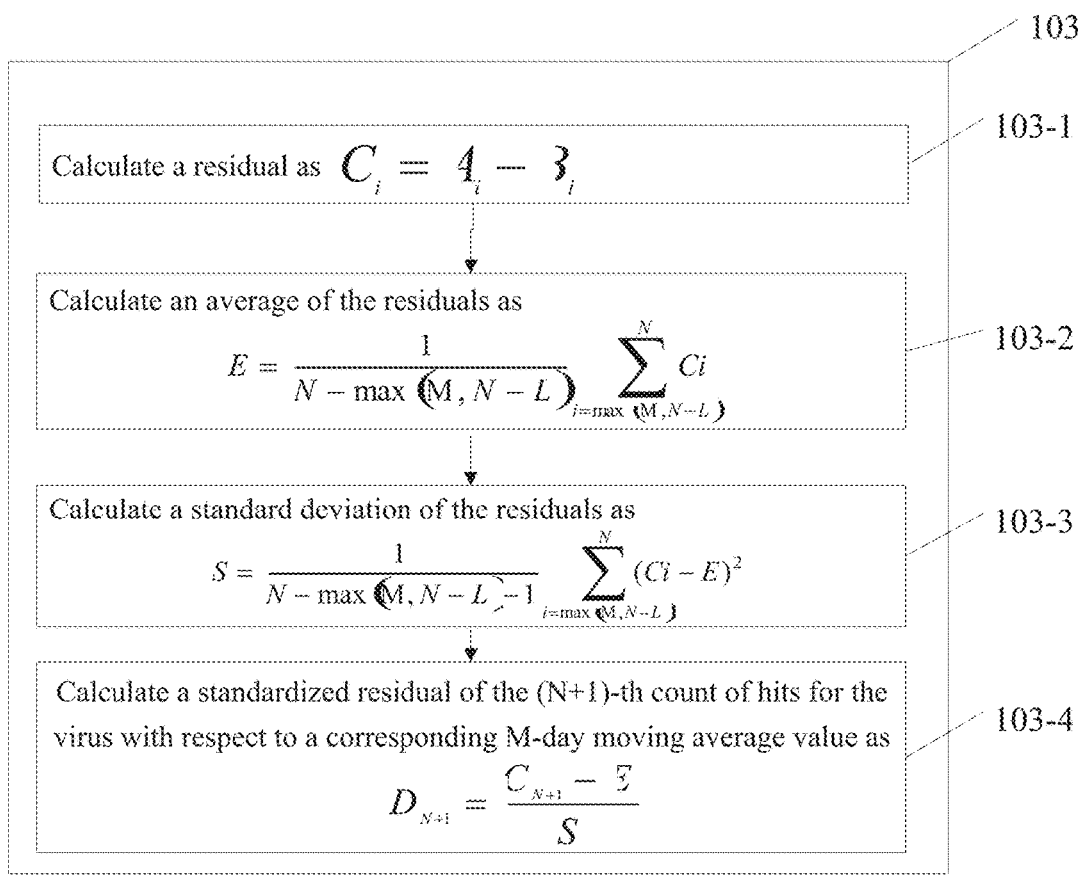
FIG. 2 is a flow chart of performing the step 103 in the method for detecting a virus trend abnormality according to the first embodiment.

In one example illustrated in FIG. 2, step 103 may involve the following sub-steps 103-1 to 103-4.

The sub-step 103-1 may include calculation of a residual as $C_i = A_i - B_i$.

$C_i$ may be the residual of the i-th count of hits for the virus with respect to the M-day moving average value calculated from the i-th count of hits to the (i-M+1)-th count of hits for the virus, $A_i$ may be the i-th count of hits for the virus, $B_i$ may be the M-day moving average value calculated from the i-th count of hits to the (i-M+1)-th count of hits for the virus, i∈[M N+1] and i is a positive integer, and N+1 is the total number of times counts of hits of a virus have been determined and/or stored.

The sub-step 103-2 may involve calculation of the average of the residuals as $$E = \frac{1}{N - \max(M, N-L)} \sum_{i=\max(M,N-L)}^{N} Ci.$$

Here, E is the average of the residuals corresponding to the respective counts of hits for the virus, L∈[1 ... N] and L is a positive integer.

In one example, the value of L may be 90. That is, in this example, the residuals calculated from the last 90 counts of hits among the last N counts of hits are used as standard data to monitor the (N+1)-th count of hits for an abnormality.

The sub-step 103-3 may involve calculation of the standard deviation of the residuals as $$S = \frac{1}{N - \max(M, N-L) - 1} \sum_{i=\max(M,N-L)}^{N} (Ci - E)^2.$$

Here, S is the standard deviation of the residuals corresponding to the respective counts of hits for the virus.

The sub-step 103-4 may involve calculation of a standardized residual of the (N+1)-th count of hits for the virus with respect to a corresponding M-day moving average value as $$D_{N+1} = \frac{C_{N+1} - E}{S}.$$

Here, $D_{N+1}$ is the standardized residual of the (N+1)-th count of hits for the virus with respect to the corresponding M-day moving average value, and $C_{N+1}$ is a residual of the (N+1)-th count of hits for the virus with respect to the M-day moving average value calculated from the (N+1)-th count of hits to the (N-M+2)-th count of hits for the virus.

The sub-step 104 may involve identification of a time point of the occurrence of the count of hit corresponding to a standardized residual, that may cause an abnormality point in the development trend of the virus. The count of hit may cause the abnormality in the case that the standardized residual is larger than a first preset threshold.

Thus, the time point of the occurrence of the (N+1)-th count of hit for the virus may be identified as an abnormality point in the development trend of the virus when $D_{N+1} > \omega_1$, where $\omega_1$ is the first preset threshold.

In an example, the value of $\omega_1$ may be 2.58 corresponding to an confidence interval of 95% or 1.96 corresponding to an confidence interval of 99%.

In one embodiment, the M-day moving average operation may be performed on the respective counts of hits for the virus to obtain the respective M-day moving average values. Then, the standardized residuals of the respective counts of hits for the virus with respect to their corresponding M-day moving average values may be calculated. Since the respective standardized residuals calculated in connection with the M-day moving average operation may be assumed to comply with a normal distribution (see the following description for verifying the respective standardized residuals, calculated in connection with the M-day moving average operation, for compliance with the normal distribution), a confidence interval may be used to accurately determine whether the count of hit, each time the virus is scanned for and terminated, triggers an abnormality and further determine whether the trend of the virus is abnormal. For example, the first preset threshold may be set to 1.96 corresponding to the confidence interval of 95%. In this case, a time point of the occurrence of the count of hits corresponding to a standardized residual may be identified as an abnormality point in the development trend of the virus when the standardized residual is larger than the first preset threshold of 1.96.

As would be apparent to a person of skilled in the art, in another embodiment, when the trend of the virus is monitored for an abnormality, the first preset threshold may be set according to different confidence intervals, and the M-day moving average operation may be performed simply using at least M pieces of data. Generally, the threshold may be derived through learning and analyzing a large amount of historical data. But, for a new virus or a mutated virus, it may be difficult to provide a large amount of historical data in a short period. Thus, using historical data may not be a viable solution for detection of the new virus or the mutated virus effectively or in a timely manner. In some embodiment of the present disclosure, the first preset threshold may be determined without a large amount of historical data, so that the new virus and the mutated virus may also be detected accurately. Moreover, each time the latest count of hits is obtained when the virus is scanned for and/or terminated, determination of the abnormality may be made using the method described in this disclosure. According to the method, the calculated standardized residual of the latest count of hits for the virus with respect to the corresponding M-day moving average value being larger than the first preset threshold, may indicate that the latest count of hits for the virus is abnormal, and thus various types of viruses may be detected effectively in a timely manner.

Figure 3:
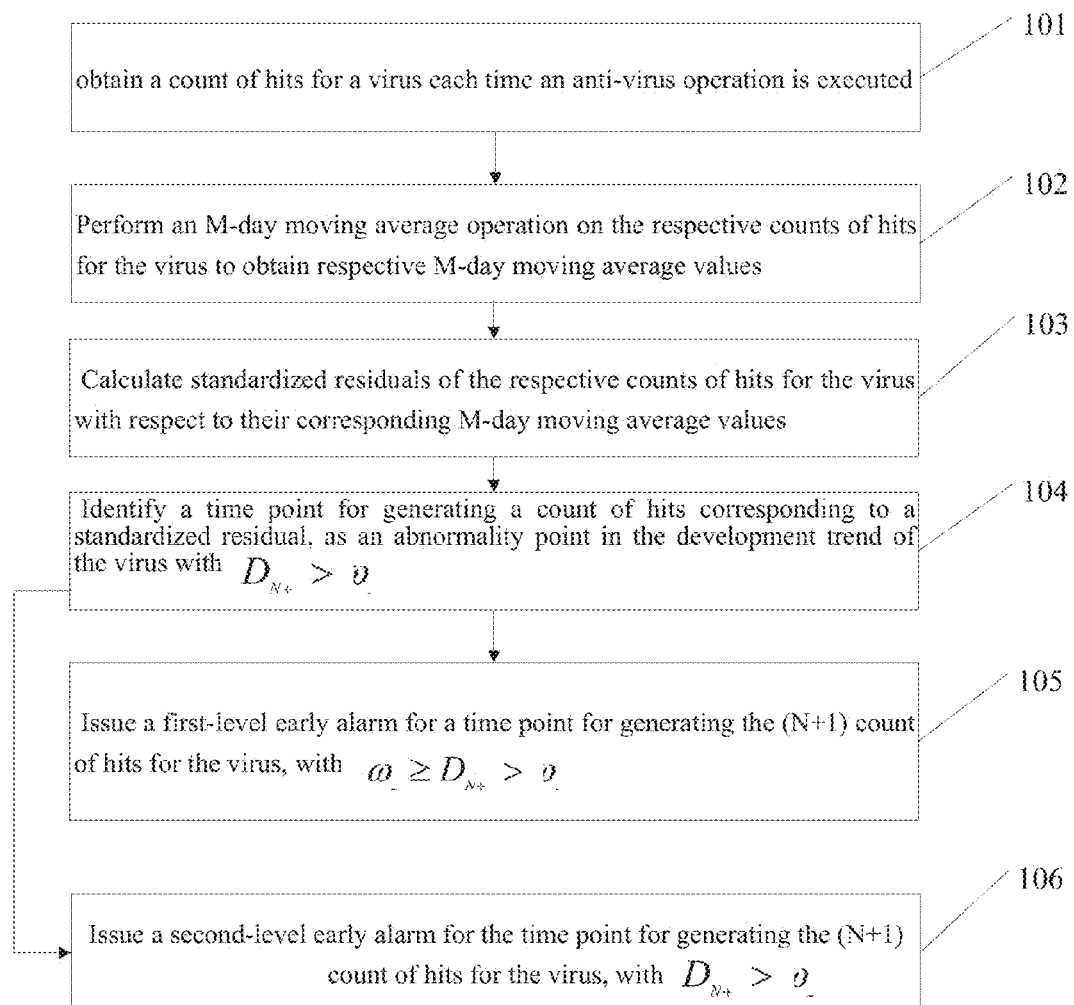
FIG. 3 is a flow chart of another method for detecting a virus trend abnormality according to the first embodiment.

In yet other embodiments, as illustrated in FIG. 3, this method may further includes steps 105 to 106 described below.

The step 105 may involve issuance of a first-level early alarm for a time point of occurrence of the (N+1)-th count of hits for the virus, with $\omega_2 \geq D_{N+1} > \omega_1$, where $\omega_1$ is the first preset threshold and $\omega_2$ is a second preset threshold.

The value of $\omega_1$ may be 1.96 corresponding to the confidence interval of 99%, and the value of $\omega_2$ may be 2.58 corresponding to the confidence interval of 95%. The values of $\omega_1$ and $\omega_2$ may be set to any other values based on a confidence interval desired, as described earlier.

If the standardized residual calculated from the (N+1)-th count of hits lies in the interval of [1.96,2.58), it may indicate a probability of 95% that the development trend of the virus is abnormal. In such a case, the first-level early alarm, e.g., a blue early alarm, may be issued at the time point the (N+1)-th count of hits for the virus occurred. The first-level alarm may instruct a technician to perform a relevant process.

The step 106 may involve issuance of a second-level early alarm for the time point of the occurrence of the (N+1)-th count of hits for the virus, with $D_{N+1}>\omega_2$.

If the standardized residual calculated from the (N+1)-th count of hits lies in the interval of [2.58,∞), it may indicate a probability of 99% that the development trend of the virus is abnormal. In this case, the second-level early alarm, e.g., a red early alarm, may be issued for the time point the (N+1)-th count of hits for the virus occurred. The second-level alarm may instruct the technician to perform a relevant process.

Figure 4:
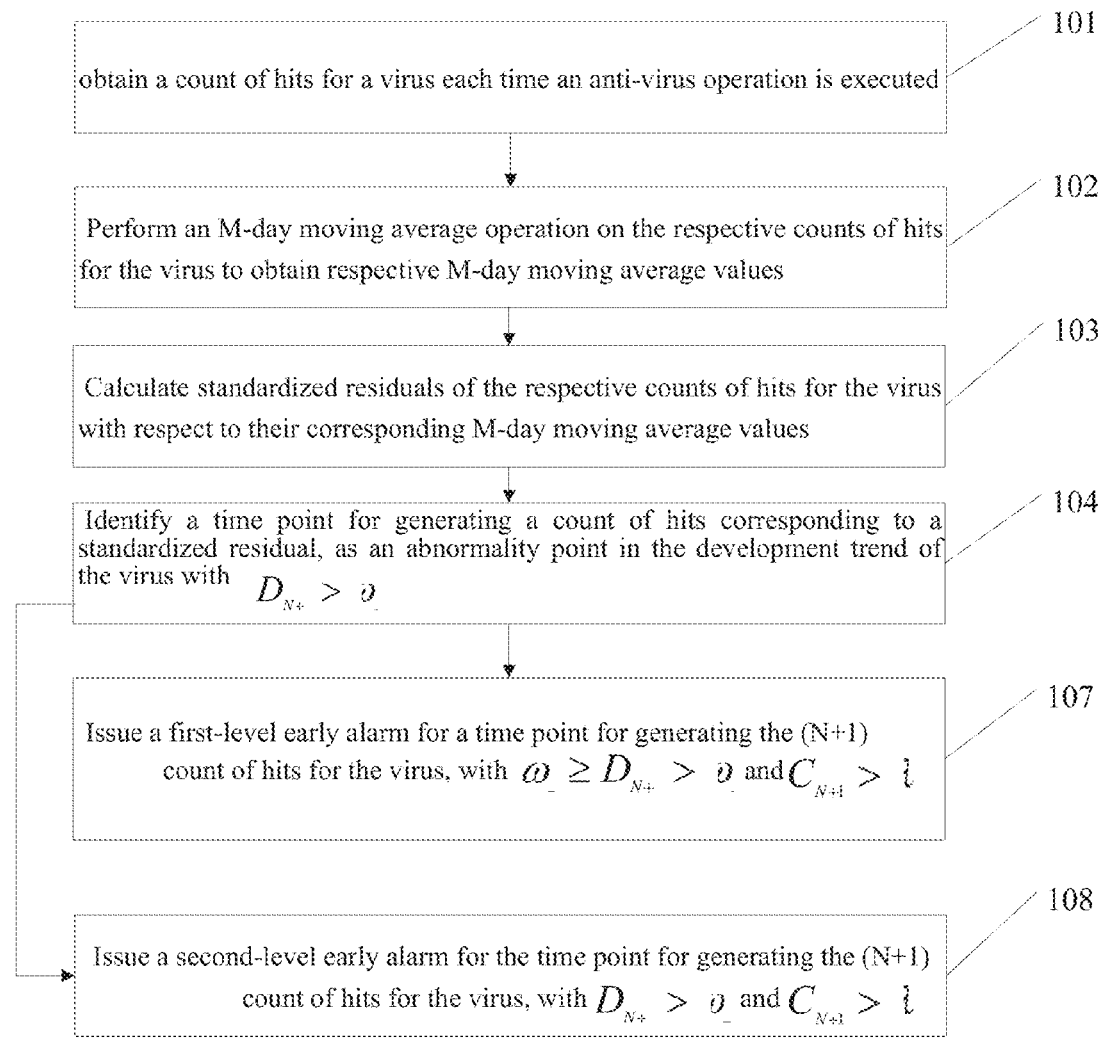
FIG. 4 is a flow chart of still another method for detecting a virus trend abnormality according to the first embodiment.

Further, in yet another embodiment, as illustrated in FIG. 4, the method may include steps 107 to 108.

The step 107 may involve issuance of a first-level early alarm for the time point of occurrence of the (N+1)-th count of hits for the virus, with $\omega_2 \geq D_{N+1}>\omega_1$ and $C_{N+1}>\lambda$, where $\omega_1$ is the first preset threshold, $\omega_2$ is a second preset threshold, and $\lambda$ is a preset variation threshold.

In an example, the value of $\omega_1$ may be 1.96 corresponding to the confidence interval of 99%, and the value of $\omega_2$ may be 2.58 corresponding to the confidence interval of 95%. The values of $\omega_1$ and $\omega_2$ may be set to any other values based on a confidence interval desired, as described earlier.

A precondition of $C_{N+1}>\lambda$ may be further added for the first-level early alarm in addition to the step 105 above. An example value of $\lambda$ may be 500. Here, $C_{N+1}$ is the residual of the (N+1)-th count of hits for the virus with respect to the M-day moving average value calculated from the (N+1)-th count of hits to the (N-M+2)-th count of hits for the virus. That is, $C_{N+1}$ represents a variation value of the (N+1)-th count of hits relative to the M-day moving average value calculated from the (N+1)-th count of hits to the (N-M+2)-th count of hits for the virus. A value of $C_{N+1}$ below 500 may indicate a smaller variation of the (N+1)-th count of hits, which may be of lower significance for detection of the abnormality of the virus trend. A value of $C_{N+1}$ above 500 may indicate a larger variation of the (N+1)-th count of hits, which may be of higher significance for detection of the abnormality of the virus and may reflect the development trend of the virus more reasonably.

The step 108 may involve issuance of a second-level early alarm for the time point for generating the (N+1)-th count of hits for the virus, with $D_{N+1}>\omega_2$ and $C_{N+1}>\lambda$.

The precondition of $C_{N+1}>\lambda$ may be further added for the second-level early alarm in addition to the step 105 above. An example value of $\lambda$ may be 500. Reference can be made to the step 107 above for a relevant description thereof.

Some schematic diagrams of resulting detection effects while monitoring the trend of a virus in the method according to the embodiment are provided and described below.

Figure 5:
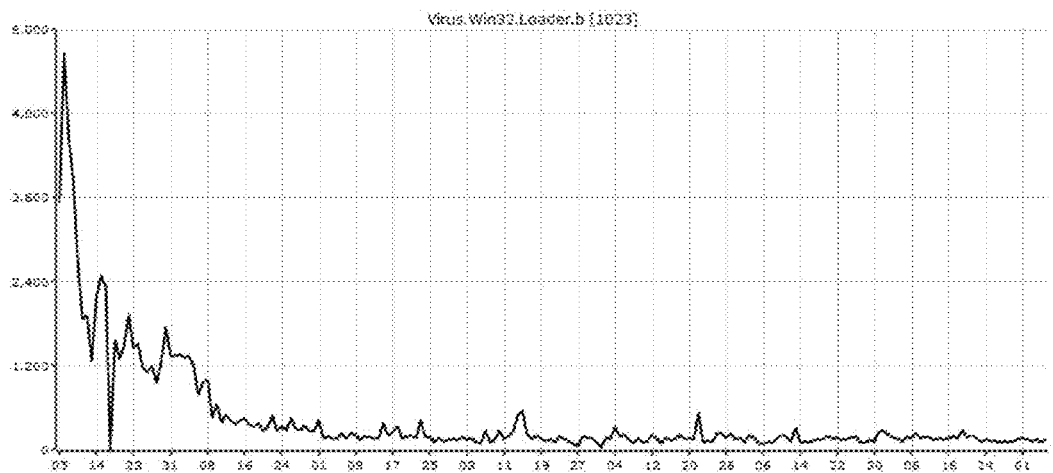
FIG. 5 is a schematic diagram where no abnormality is detected while monitoring a virus trend in the method according to an embodiment.

FIG. 5 is a schematic diagram where no abnormality is detected while monitoring the trend of a virus identified as Virus.Win32.Loader.b[1023] in the detecting method described earlier. In the figure, the abscissa represents the time when the virus is scanned for and terminated, and the ordinate represents the count of hits when the virus is scanned for and terminated.

Figure 6:
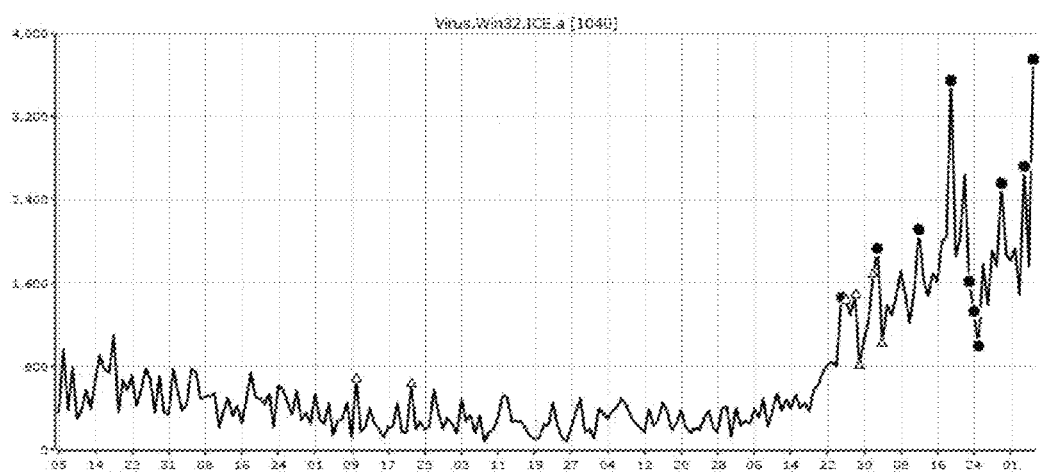
FIG. 6 is a schematic diagram where an abnormality is detected and an alarm is issued while monitoring a virus trend in the detecting method according to an embodiment.
Figure 7:
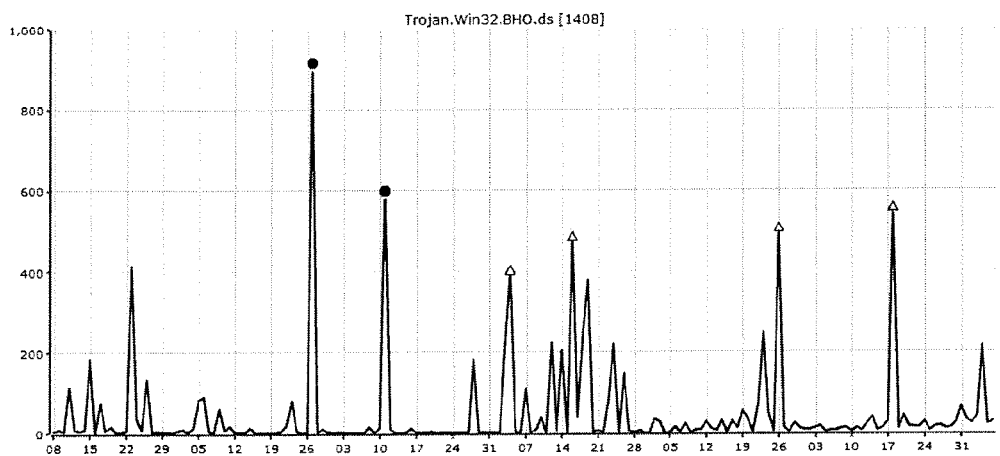
FIG. 7 is another schematic diagram where an abnormality is detected and an alarm is issued while monitoring a virus trend in the detecting method according to an embodiment.

FIG. 6 is a schematic diagram where an abnormality is detected and an alarm is issued while monitoring the trend of a virus of Virus.Win32.ICE.a[1040] in the detecting method as described earlier. FIG. 7 is a schematic diagram where an abnormality is detected and an alarm is issued while monitoring the trend of a virus of Trojan.Win32.BHO.ds[1408] identified in the detecting method according to the embodiments described earlier. In the figure, the abscissa represents the time when the virus is scanned for and terminated, the ordinate represents the count of hits when the virus is scanned for and terminated. The illustrated triangle represents a blue early alarm i.e. the first-level alarm, and the circle represents a red early alarm, i.e. the second-level alarm.

Figure 8:
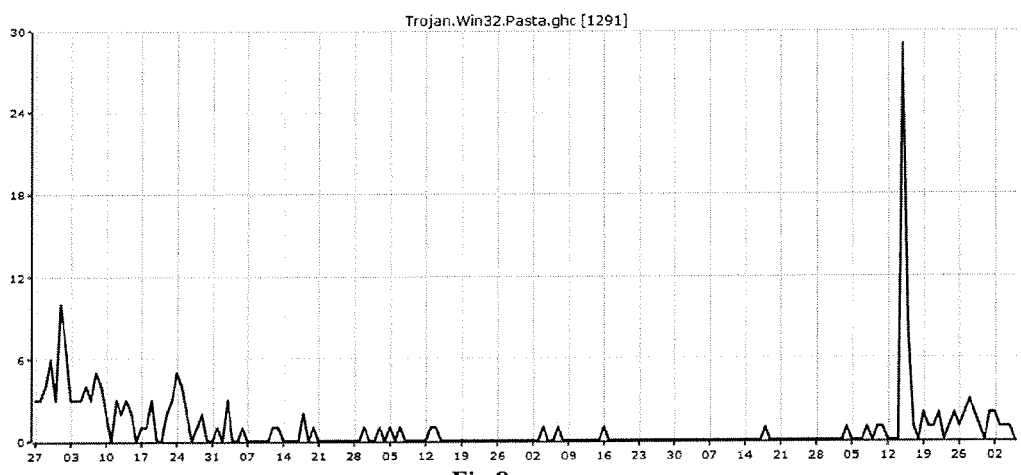
FIG. 8 is a schematic diagram where no alarm has been issued because the condition of $C_{N+1} > \lambda$ is not satisfied while monitoring a virus trend in the detecting method illustrated in FIG. 4 according to an embodiment.

FIG. 8 is a schematic effect diagram where no alarm has been issued because the condition of $C_{N+1}>\lambda$ is not satisfied while monitoring the trend of a virus identified as Trojan.Win32.Pasta.ghc[1291] in the detecting method illustrated in FIG. 4. In FIG. 8, the abscissa represents the time when the virus is scanned for and terminated, and the ordinate represents the count of hits when the virus is scanned for and terminated.

The detecting method in the embodiment is based upon Pauta criterion, with a principle of operation that data complying with a normal distribution may have an abnormality point determined accurately in a confidence interval. The respective standardized residuals calculated in connection with the M-day moving average operation in the above described embodiments may comply with the normal distribution. A process is described below in details in which the respective standardized residuals calculated in connection with the M-day moving average operation are verified for compliance with a normal distribution.

For a virus engine, the counts of hits of each virus scanned for and terminated by the virus engine may be attributed to a set of data in an order of the earliest scanning and terminating time to the latest. Each virus may have a set of data corresponding thereto.

First, 10 sets of sample data may be randomly picked. The sample data sets may include sample data of a virus D1000 depicted in the columns 1-2 in Table 1, sample data of a virus D1003 depicted in the columns 4-5 in Table 1, sample data of a virus D1021 depicted in the columns 7-8 in Table 1, sample data of a virus D1022 depicted in the columns 1-2 in Table 2, sample data of a virus D1026 depicted in the columns 4-5 in Table 2, sample data of a virus D1070 depicted in the columns 7-8 in Table 2, sample data of a virus D100000 depicted in the columns 1-2 in Table 3, sample data of a virus D200000 depicted in the columns 4-5 in Table 3, sample data of a virus D400015 depicted in the columns 1-2 in Table 4, and sample data of a virus D500003 depicted in the columns 4-5 in Table 4. The tables with the sample data sets are provided below.

Next an M-day moving average operation may be performed on each set of sample data to obtain M-day moving average values as per the step 102 in the method described earlier. Further, standardized residuals of the respective counts of hits for the viruses with respect to their corresponding M-day moving average values may be calculated from the M-day moving average values as per the step 103 described earlier.

The columns 3, 6 and 9 in Tables 1-2 are the standardized residuals of the counts of hits for the viruses listed in Tables 1-2 with respect to the corresponding M-day moving average values; and the columns 3 and 6 in Tables 3-4 are the standardized residuals of the counts of hits of the viruses listed in Tables 3-4 with respect to the corresponding M-day moving average values.

The calculated standardized residuals of each set of sample data are imported into statistical analysis software, like SPPS software, for statistical analysis such as K-S verification. FIG. 9 is a schematic result diagram thereof, depicting that the calculated standardized residuals of each set of sample data may be compliant with a normal distribution. The description of the use of the statistical analysis software for K-S verification to verify that the data complies with normal distribution is omitted from the present disclosure.

TABLE 1

| D1000 | | | D1003 | | | D1021 | | |
|---|---|---|---|---|---|---|---|---|
| Scanning and termination time | Count of hits | Standardized residual | Scanning and termination time | Count of hits | Standardized residual | Scanning and termination time | Count of hits | Standardized residual |
| 201107052155 | 1895 | | 201107052155 | 43 | | 201107052155 | 18005 | |
| 201107062002 | 2222 | | 201107062002 | 70 | | 201107062002 | 24150 | |
| 201107070112 | 2108 | | 201107070112 | 42 | | 201107070112 | 21124 | |
| 201107091516 | 2016 | | 201107091516 | 37 | | 201107091516 | 21236 | |
| 201107101803 | 1537 | | 201107101803 | 52 | | 201107101803 | 22956 | |
| 201107112201 | 2068 | | 201107112201 | 75 | | 201107112201 | 21388 | |
| 201107121230 | 2105 | 1.328076819 | 201107121230 | 36 | −1.177678718 | 201107121230 | 22610 | 0.676634367 |
| 201107131230 | 1487 | −2.817030456 | 201107131230 | 39 | −0.849222794 | 201107131230 | 16610 | −2.484412126 |
| 201107141230 | 1694 | −0.725433447 | 201107141230 | 27 | −1.38789051 | 201107141230 | 22899 | 1.040109951 |
| 201107151230 | 1553 | −1.182474371 | 201107151230 | 40 | −0.16603447 | 201107151230 | 23467 | 1.167236879 |
| 201107161230 | 1334 | −2.082802674 | 201107161230 | 27 | −1.230231666 | 201107161230 | 22874 | 0.716570751 |
| 201107181230 | 1488 | −0.890476003 | 201107181230 | 48 | 0.753642119 | 201107181230 | 15126 | −2.896076055 |
| 201107191058 | 1314 | −1.381371811 | 201107191058 | 41 | 0.556568565 | 201107191058 | 13962 | −2.952282817 |
| 201107191701 | 1312 | −0.557216995 | 201107191701 | 41 | 0.49087738 | 201107191701 | 21239 | 1.119982718 |
| 201107201100 | 1304 | −0.422855427 | 201107201100 | 36 | 0.070453796 | 201107201100 | 25376 | 2.691981532 |
| 201107211214 | 1250 | −0.35302973 | 201107211214 | 22 | −1.151402244 | 201107211214 | 26306 | 2.93354605 |
| 201107220859 | 1102 | −0.971939316 | 201107220859 | 18 | −1.230231666 | 201107220859 | 26693 | 2.893298272 |
| 201107230853 | 956 | −1.653268842 | 201107230853 | 8 | −1.900281753 | 201107230853 | 23434 | 1.07374059 |
| 201107240849 | 808 | −2.029904419 | 201107240849 | 19 | −0.507628632 | 201107240849 | 22550 | 0.014064076 |
| 201107250856 | 1067 | 0.149503694 | 201107250856 | 24 | 0.175559692 | 201107250856 | 21278 | −1.24864185 |
| 201107261323 | 1034 | 0.199228054 | 201107261323 | 11 | −0.625872765 | 201107261323 | 21255 | −1.26242107 |
| 201107270854 | 1070 | 0.713399094 | 201107270854 | 12 | −0.218587418 | 201107270854 | 21346 | −0.899101184 |
| 201107280836 | 931 | 0.021489916 | 201107280836 | 14 | 0.070453796 | 201107280836 | 19533 | −1.359809795 |
| 201107281427 | 931 | 0.202401949 | 201107281427 | 14 | 0.123006744 | 201107281427 | 19530 | −0.803814374 |
| 201107290840 | 963 | 0.431980376 | 201107290840 | 10 | −0.271140366 | 201107290840 | 24643 | 1.888349394 |
| 201107300841 | 822 | −0.627042692 | 201107300841 | 7 | −0.389384499 | 201107300841 | 22932 | 0.926217302 |
| 201107310839 | 746 | −0.850273329 | 201107310839 | 4 | −0.402522736 | 201107310839 | 23522 | 1.073039951 |
| 201107311623 | 746 | −0.545579379 | 201107311623 | 4 | −0.310555077 | 201107311623 | 23439 | 0.857788294 |
| 201107311810 | 746 | −0.202798686 | 201107311810 | 4 | −0.205449181 | 201107311810 | 23439 | 0.694850963 |
| 201107312014 | 746 | −0.007075142 | 201107312014 | 4 | −0.074066811 | 201107312014 | 23522 | 0.429542591 |
| 201108010900 | 985 | 1.70577036 | 201108010900 | 7 | 0.293803825 | 201108010900 | 21573 | −0.791592128 |
| 201108011242 | 985 | 1.682495128 | 201108011242 | 7 | 0.333218536 | 201108011242 | 21368 | −0.648350519 |
| 201108011440 | 985 | 1.510046816 | 201108011440 | 7 | 0.333218536 | 201108011440 | 21578 | −0.428505788 |
| 201108100931 | 0 | −4.995380603 | 201108100931 | 0 | −0.258002129 | 201108020913 | 21320 | −0.397677703 |
| 201108110917 | 829 | 1.056179787 | 201108110917 | 9 | 0.504015617 | 201108030922 | 20743 | −0.502228508 |
| 201108120903 | 780 | 0.657326943 | 201108120903 | 7 | 0.280665588 | 201108041329 | 22002 | 0.295720675 |
| 201108130851 | 731 | 0.310314389 | 201108130851 | 26 | 1.739009894 | 201108051239 | 19897 | −0.56917839 |
| 201108140835 | 562 | −0.493739089 | 201108140835 | 9 | 0.149283218 | 201108061540 | 20041 | −0.37144269 |
| 201108150839 | 793 | 1.420119783 | 201108150839 | 32 | 1.936083449 | 201108071734 | 18265 | −1.09769322 |
| 201108161313 | 753 | 1.369337458 | 201108161313 | 8 | −0.284278603 | 201108080908 | 19282 | −0.364747702 |
| 201108170843 | 737 | 0.471125085 | 201108170843 | 24 | 0.871886252 | 201108090903 | 20241 | 0.241849374 |
| 201108171943 | 738 | 0.574805665 | 201108171943 | 24 | 0.674812697 | 201108100931 | 18908 | −0.341704487 |
| 201108180938 | 751 | 0.701761478 | 201108180938 | 3 | −1.203955192 | 201108110917 | 18383 | −0.346064014 |
| 201108181308 | 751 | 0.680602175 | 201108181308 | 3 | −0.901775742 | 201108120903 | 18420 | −0.21091867 |
| 201108181453 | 751 | 0.480646715 | 201108181453 | 3 | −0.82294632 | 201108130851 | 17925 | −0.315936567 |
| 201108181759 | 751 | 0.525081305 | 201108181759 | 3 | −0.441937447 | 201108140835 | 15802 | −1.281104758 |
| 201108190849 | 655 | −0.082190664 | 201108190849 | 8 | 0.017900848 | 201108150839 | 17039 | −0.432398223 |
| 201108200852 | 570 | −0.534999728 | 201108200852 | 6 | 0.070453796 | 201108161313 | 17239 | −0.089708243 |
| 201108210855 | 478 | −0.941258328 | 201108210855 | 5 | 0.22811264 | 201108170843 | 17357 | 0.095338119 |
| 201108220841 | 627 | 0.293386948 | 201108220841 | 38 | 2.80320709 | 201108171943 | 17352 | 0.172875425 |
| 201108230905 | 439 | −0.768810016 | 201108230905 | 46 | 2.974004171 | 201108180938 | 17967 | 0.543279543 |
| 201108231309 | 439 | −0.438724904 | 201108231309 | 46 | 2.40905998 | 201108181308 | 17967 | 0.540009898 |
| 201108231831 | 439 | −0.108630792 | 201108231831 | 46 | 1.84411579 | 201108181453 | 17967 | 0.371467461 |
| 201108240837 | 462 | 0.265879855 | 201108240837 | 4 | −1.965972938 | 201108181759 | 17967 | 0.299223866 |
| 201108241631 | 462 | 0.380140086 | 201108241631 | 4 | −1.939696464 | 201108190849 | 18767 | 0.616223776 |
| 201108250911 | 497 | 0.619240199 | 201108250911 | 6 | −1.768899383 | 201108200852 | 15847 | −0.857452129 |
| 201108260841 | 479 | 0.642515432 | 201108260841 | 15 | −0.639011002 | 201108210855 | 15388 | −0.954685156 |
| 201108270841 | 356 | −0.180581419 | 201108270841 | 5 | −1.020019874 | 201108220841 | 16897 | −0.049071221 |
| 201108271532 | 356 | −0.092770315 | 201108271532 | 5 | −0.481352158 | 201108230905 | 16329 | −0.231081483 |
| 201108280851 | 315 | −0.265218627 | 201108280851 | 1 | −0.258002129 | 201108231309 | 16325 | −0.10543368 |
| 201108281238 | 315 | −0.109697757 | 201108281238 | 1 | −0.218587418 | 201108231831 | 16330 | 0.024729348 |
| 201108290920 | 359 | 0.325125901 | 201108290920 | 8 | 0.372633247 | 201108240837 | 17871 | 0.934235718 |
| 201108291222 | 359 | 0.471125085 | 201108291222 | 8 | 0.346356773 | 201108241631 | 17869 | 0.775735763 |
| 201108300841 | 316 | 0.325125901 | 201108300841 | 1 | −0.113481522 | 201108250911 | 16771 | 0.069725897 |
| 201108301851 | 316 | 0.367444505 | 201108301851 | 1 | −0.060928574 | 201108260841 | 16329 | −0.126919922 |
| 201108310852 | 368 | 0.739848221 | 201108310852 | 3 | 0.149283218 | 201108270841 | 16082 | −0.242291696 |

TABLE 1-continued

| D1000 | | | D1003 | | | D1021 | | |
|---|---|---|---|---|---|---|---|---|
| Scanning and termination time | Count of hits | Standardized residual | Scanning and termination time | Count of hits | Standardized residual | Scanning and termination time | Count of hits | Standardized residual |
| 201108311700 | 368 | 0.683776071 | 201108311700 | 3 | 0.123006744 | 201108271532 | 16083 | −0.22290737 |
| 201109011158 | 378 | 0.691181827 | 201109011158 | 14 | 0.963853911 | 201108280851 | 13940 | −1.204657334 |
| 201109021211 | 293 | 0.131518287 | 201109021211 | 2 | −0.060928574 | 201108281238 | 13940 | −0.898634092 |
| 201109031504 | 183 | −0.496912984 | 201109031504 | 3 | 0.09673027 | 201108290920 | 16421 | 0.566089212 |
| 201109041542 | 158 | −0.514898391 | 201109041542 | 1 | −0.087205048 | 201108291222 | 16419 | 0.592402073 |
| 201109041700 | 158 | −0.347739905 | 201109041700 | 1 | −0.087205048 | 201108300841 | 15302 | 0.063653698 |
| 201109050848 | 195 | 0.10930102 | 201109050848 | 29 | 2.146295241 | 201108301851 | 15368 | 0.15520377 |
| 201109051321 | 195 | 0.292328983 | 201109051321 | 29 | 1.804701079 | 201108310852 | 14833 | −0.039028738 |
| 201109051827 | 195 | 0.485936596 | 201109051827 | 29 | 1.607627524 | 201108311700 | 14888 | −0.082857557 |
| 201109060932 | 187 | 0.538834852 | 201109060932 | 9 | −0.323693314 | 201109011158 | 12459 | −1.29122509 |
| 201109061224 | 187 | 0.534602991 | 201109061224 | 9 | −0.402522736 | 201109021211 | 13549 | −0.473658035 |
| 201109061949 | 187 | 0.503922003 | 201109061949 | 9 | −0.507628632 | 201109031504 | 15538 | 0.678814131 |
| 201109062121 | 187 | 0.473241015 | 201109062121 | 9 | −0.612734528 | 201109041542 | 13558 | −0.264400727 |
| 201109071244 | 235 | 0.786398686 | 201109071244 | 3 | −0.82294632 | 201109041700 | 13560 | −0.122560394 |
| 201109071502 | 235 | 0.744080082 | 201109071502 | 3 | −0.481352158 | 201109050848 | 12797 | −0.37985035 |
| 201109081134 | 191 | 0.42245869 | 201109081134 | 2 | −0.218587418 | 201109051321 | 12792 | −0.219404178 |
| 201109090918 | 172 | 0.297618808 | 201109090918 | 8 | 0.346356773 | 201109051827 | 12792 | −0.245327795 |
| 201109100928 | 182 | 0.376966191 | 201109100928 | 2 | −0.113481522 | 201109060932 | 13516 | 0.151778427 |
| 201109110917 | 138 | 0.102953229 | 201109110917 | 1 | −0.100343285 | 201109061224 | 13516 | 0.3091885 |
| 201109120830 | 94 | −0.124509268 | 201109120830 | 9 | 0.635397987 | 201109061949 | 13518 | 0.31339233 |
| | | | | | | 201109062121 | 13518 | 0.316661975 |
| | | | | | | 201109071244 | 14946 | 0.92754073 |
| | | | | | | 201109071502 | 14946 | 0.759854628 |
| | | | | | | 201109081134 | 12401 | −0.596581133 |
| | | | | | | 201109090918 | 12045 | −0.676064656 |
| | | | | | | 201109100928 | 16002 | 1.286734635 |
| | | | | | | 201109110917 | 13852 | 0.089110223 |
| | | | | | | 201109120830 | 13700 | −0.007889258 |

TABLE 2

| D1022 | | | D1026 | | | D1070 | | |
|---|---|---|---|---|---|---|---|---|
| Scanning and termination time | Count of hits | Standardized residual | Scanning and termination time | Count of hits | Standardized residual | Scanning and termination time | Count of hits | Standardized residual |
| 201107052155 | 25475 | | 201107052155 | 27313 | | 201107112201 | 60997 | |
| 201107062002 | 38796 | | 201107062002 | 46585 | | 201107121230 | 73607 | |
| 201107070112 | 30555 | | 201107070112 | 25112 | | 201107131230 | 50082 | |
| 201107091516 | 20901 | | 201107091516 | 46338 | | 201107141230 | 64657 | |
| 201107101803 | 17781 | | 201107101803 | 24895 | | 201107151230 | 67143 | |
| 201107112201 | 14802 | | 201107112201 | 25152 | | 201107161230 | 60570 | |
| 201107121230 | 16964 | −0.234138052 | 201107121230 | 32267 | 0.006325427 | 201107181230 | 50154 | −1.184141483 |
| 201107131230 | 38402 | 0.304906424 | 201107131230 | 27968 | −0.122270621 | 201107191058 | 50540 | −0.933472986 |
| 201107141230 | 72207 | 1.103707454 | 201107141230 | 21081 | −0.217228773 | 201107191701 | 50334 | −0.517609778 |
| 201107151230 | 90849 | 1.379638606 | 201107151230 | 30552 | 0.03729086 | 201107201100 | 61431 | 0.745924032 |
| 201107161230 | 101604 | 1.358342381 | 201107161230 | 27535 | 0.027604752 | 201107211214 | 75280 | 2.390251462 |
| 201107181230 | 68861 | 0.256657779 | 201107181230 | 9021 | −0.448018277 | 201107220859 | 63509 | 0.889878879 |
| 201107191058 | 74471 | 0.176476588 | 201107191058 | 8122 | −0.40311338 | 201107230853 | 65829 | 1.099058206 |
| 201107191701 | 74170 | −0.056661651 | 201107191701 | 8096 | −0.30278521 | 201107240849 | 63865 | 0.575986069 |
| 201107201100 | 122514 | 0.942885189 | 201107201100 | 24444 | 0.19055386 | 201107250856 | 61315 | 0.030702557 |
| 201107211214 | 187754 | 2.28375729 | 201107211214 | 34484 | 0.428428108 | 201107261323 | 64780 | 0.217556215 |
| 201107220859 | 191758 | 1.997288084 | 201107220859 | 36393 | 0.459887048 | 201107270854 | 57899 | −0.632705078 |
| 201107230853 | 197955 | 1.789074053 | 201107230853 | 38082 | 0.465223608 | 201107280836 | 60763 | 0.025730715 |
| 201107240849 | 202890 | 1.398037947 | 201107240849 | 39368 | 0.375953326 | 201107281427 | 60767 | 0.078497014 |
| 201107250856 | 218393 | 1.258889247 | 201107250856 | 44591 | 0.376338094 | 201107290840 | 67903 | 0.990534882 |
| 201107261323 | 241846 | 1.245112343 | 201107261323 | 47645 | 0.300342297 | 201107300841 | 73749 | 1.581784126 |
| 201107270854 | 219267 | 0.243560876 | 201107270854 | 48748 | 0.230987924 | 201107310839 | 77833 | 1.811708038 |
| 201107280836 | 223486 | 0.219194819 | 201107280836 | 27872 | −0.352520614 | 201107311623 | 77838 | 1.563630233 |
| 201107281427 | 223495 | 0.094695626 | 201107281427 | 27874 | −0.316833412 | 201107311810 | 77838 | 1.183808122 |
| 201107290840 | 280277 | 1.333445687 | 201107290840 | 55163 | 0.410636786 | 201107312014 | 77832 | 0.857857164 |
| 201107300841 | 258646 | 0.519122547 | 201107300841 | 88620 | 1.184132726 | 201108010900 | 81971 | 1.005850443 |
| 201107310839 | 270050 | 0.629852696 | 201107310839 | 95392 | 1.169925597 | 201108011242 | 81958 | 0.73638038 |
| 201107311623 | 270051 | 0.519016419 | 201107311623 | 95393 | 0.970260452 | 201108011440 | 81976 | 0.582062765 |
| 201107311810 | 270050 | 0.319379052 | 201107311810 | 95392 | 0.775153967 | 201108020913 | 85530 | 0.909347167 |
| 201107312014 | 270052 | 0.13639975 | 201107312014 | 95392 | 0.492767955 | 201108030922 | 75655 | −0.365844757 |
| 201108010900 | 267638 | −0.10353064 | 201108010900 | 77511 | −0.238307349 | 201108041329 | 64935 | −1.549505247 |
| 201108011242 | 267639 | −0.053827657 | 201108011242 | 77510 | −0.331797529 | 201108051239 | 61330 | −1.71586196 |
| 201108011440 | 267639 | −0.089175931 | 201108011440 | 77511 | −0.285307557 | 201108061540 | 75566 | 0.304439642 |
| 201108020913 | 249593 | −0.505293472 | 201108020913 | 12378 | −1.8449424 | 201108071734 | 60669 | −1.276453934 |

TABLE 2-continued

| D1022 | | | D1026 | | | D1070 | | |
|---|---|---|---|---|---|---|---|---|
| Scanning and termination time | Count of hits | Standardized residual | Scanning and termination time | Count of hits | Standardized residual | Scanning and termination time | Count of hits | Standardized residual |
| 201108030922 | 211568 | −1.321656616 | 201108030922 | 17796 | −1.361795491 | 201108080908 | 59019 | −1.059159645 |
| 201108041329 | 149049 | −2.566224029 | 201108041329 | 46046 | −0.328376442 | 201108090903 | 45574 | −2.090845573 |
| 201108051239 | 148916 | −2.093741065 | 201108051239 | 25939 | −0.626554658 | 201108100931 | 48845 | −1.143966708 |
| 201108061540 | 161778 | −1.323751649 | 201108061540 | 57632 | 0.384422397 | 201108110917 | 48970 | −0.823178085 |
| 201108071734 | 158222 | −0.991514034 | 201108071734 | 58310 | 0.48457073 | 201108120903 | 49623 | −0.513095116 |
| 201108080908 | 139819 | −0.995448608 | 201108080908 | 50327 | 0.364552493 | 201108130851 | 43825 | −0.68158534 |
| 201108090903 | 146887 | −0.397275467 | 201108090903 | 66830 | 0.619958763 | 201108140835 | 42834 | −0.473987097 |
| 201108100931 | 136254 | −0.393804709 | 201108100931 | 63716 | 0.336744664 | 201108150839 | 41603 | −0.306373137 |
| 201108110917 | 148280 | −0.05989264 | 201108110917 | 43556 | −0.243041665 | 201108161313 | 45116 | 0.170790415 |
| 201108120903 | 149564 | −0.027111075 | 201108120903 | 17605 | −0.967923045 | 201108170843 | 42232 | −0.087802551 |
| 201108130851 | 158085 | 0.221855864 | 201108130851 | 14259 | −0.88448283 | 201108171943 | 42241 | 0.041579654 |
| 201108140835 | 182168 | 0.790364441 | 201108140835 | 32181 | −0.250523723 | 201108180938 | 43164 | 0.28769539 |
| 201108150839 | 171568 | 0.373916726 | 201108150839 | 21044 | −0.454099279 | 201108181308 | 43163 | 0.30017262 |
| 201108161313 | 153767 | −0.142911754 | 201108161313 | 13719 | −0.446420655 | 201108181453 | 43163 | 0.293905431 |
| 201108170843 | 131536 | −0.73604188 | 201108170843 | 6183 | −0.426425282 | 201108181759 | 43163 | 0.264188671 |
| 201108171943 | 131578 | −0.669236669 | 201108171943 | 6186 | −0.2700465 | 201108190849 | 47762 | 0.82703555 |
| 201108180938 | 131863 | −0.59181872 | 201108180938 | 3009 | −0.302011492 | 201108200852 | 44805 | 0.383722436 |
| 201108181308 | 131864 | −0.488725811 | 201108181308 | 3009 | −0.254961098 | 201108210855 | 41524 | −0.040122389 |
| 201108181453 | 131864 | −0.290998736 | 201108181453 | 3009 | −0.132956268 | 201108220841 | 42867 | 0.144616807 |
| 201108181759 | 131863 | −0.134960063 | 201108181759 | 3009 | −0.057529278 | 201108230905 | 48330 | 0.774650234 |
| 201108190849 | 159646 | 0.606367103 | 201108190849 | 60306 | 1.425047475 | 201108231309 | 48324 | 0.675537217 |
| 201108200852 | 210242 | 1.689125658 | 201108200852 | 116859 | 2.617806343 | 201108231831 | 48331 | 0.578024334 |
| 201108210855 | 219746 | 1.60406654 | 201108210855 | 131900 | 2.532375374 | 201108240837 | 42803 | −0.064638717 |
| 201108220841 | 211268 | 1.058685867 | 201108220841 | 101924 | 1.241115981 | 201108241631 | 42803 | −0.026502207 |
| 201108230905 | 200454 | 0.491541224 | 201108230905 | 87826 | 0.473659221 | 201108250911 | 44158 | 0.1040039 |
| 201108231309 | 200413 | 0.220971469 | 201108231309 | 87809 | 0.118506114 | 201108260841 | 43456 | −0.000823878 |
| 201108231831 | 200454 | −0.047507183 | 201108231831 | 87827 | −0.235697621 | 201108270841 | 45323 | 0.305411152 |
| 201108240837 | 136879 | −1.707252713 | 201108240837 | 18647 | −2.086768881 | 201108271532 | 45324 | 0.362692113 |
| 201108241631 | 136879 | −1.418888937 | 201108241631 | 18647 | −1.676021028 | 201108280851 | 42132 | 0.055142688 |
| 201108250911 | 134639 | −1.145996172 | 201108250911 | 15614 | −1.278476561 | 201108281238 | 42132 | 0.067924705 |
| 201108260841 | 180533 | 0.237562714 | 201108260841 | 35523 | −0.417918571 | 201108290920 | 45860 | 0.506799354 |
| 201108270841 | 245048 | 1.837377727 | 201108270841 | 159819 | 2.919853147 | 201108291222 | 45860 | 0.474377606 |
| 201108271532 | 245044 | 1.661839133 | 201108271532 | 159820 | 2.618713893 | 201108300841 | 45351 | 0.370407041 |
| 201108280851 | 266089 | 1.982894069 | 201108280851 | 174767 | 2.692693843 | 201108301851 | 45352 | 0.369987959 |
| 201108281238 | 266089 | 1.475015663 | 201108281238 | 174766 | 2.03973474 | 201108310852 | 40005 | −0.241682034 |
| 201108290920 | 227585 | 0.059064346 | 201108290920 | 149259 | 0.748525535 | 201108311700 | 40006 | −0.201050079 |
| 201108291222 | 227586 | −0.306249632 | 201108291222 | 149328 | 0.189240632 | 201109011158 | 36208 | −0.594644765 |
| 201108300841 | 199070 | −1.163715512 | 201108300841 | 109464 | −1.287050188 | 201109021211 | 35905 | −0.445413288 |
| 201108301851 | 199070 | −0.9829924 | 201108301851 | 109464 | −1.076452622 | 201109031504 | 35841 | −0.263093341 |
| 201108310852 | 192613 | −0.954565988 | 201108310852 | 53516 | −2.26928446 | 201109041542 | 48139 | 1.32366739 |
| 201108311700 | 192618 | −0.66564013 | 201108311700 | 53516 | −1.762681581 | 201109041700 | 48139 | 1.270577254 |
| 201109011158 | 139937 | −1.619273126 | 201109011158 | 65958 | −0.943369013 | 201109050848 | 36776 | −0.183105727 |
| 201109021211 | 138255 | −1.314428164 | 201109021211 | 42586 | −1.181172163 | 201109051321 | 36775 | −0.121691088 |
| 201109031504 | 150974 | −0.663336773 | 201109031504 | 106226 | 0.86220347 | 201109051827 | 36775 | −0.132491987 |
| 201109041542 | 128246 | −1.010302508 | 201109041542 | 63273 | −0.202097366 | 201109060932 | 33541 | −0.518695583 |
| 201109041700 | 128247 | −0.731895052 | 201109041700 | 63273 | −0.008914719 | 201109061224 | 33540 | −0.474996705 |
| 201109050848 | 97355 | −1.207447848 | 201109050848 | 30433 | −0.873792981 | 201109061949 | 33545 | −0.196325876 |
| 201109051321 | 97354 | −0.83302657 | 201109051321 | 30433 | −0.777253935 | 201109062121 | 33544 | 0.081563936 |
| 201109051827 | 97355 | −0.665624408 | 201109051827 | 30433 | −0.628679245 | 201109071244 | 33786 | 0.170790415 |
| 201109060932 | 76077 | −1.006678455 | 201109060932 | 20309 | −0.831899309 | 201109071502 | 33787 | 0.227842786 |
| 201109061224 | 76077 | −0.712285073 | 201109061224 | 20309 | −0.472572309 | 201109081134 | 34367 | 0.351053048 |
| 201109061949 | 76077 | −0.507227348 | 201109061949 | 20309 | −0.292885807 | 201109090918 | 31504 | 0.00809115 |
| 201109062121 | 76077 | −0.302165694 | 201109062121 | 20308 | −0.113224398 | 201109100928 | 41393 | 1.1771409 |
| 201109071244 | 67021 | −0.432104896 | 201109071244 | 12095 | −0.276972318 | 201109110917 | 40673 | 0.945350166 |
| 201109071502 | 67020 | −0.31290028 | 201109071502 | 12096 | −0.20025299 | 201109120830 | 39532 | 0.679137517 |
| 201109081134 | 81116 | 0.138773859 | 201109081134 | 24175 | 0.179541977 | 201109081134 | 2695 | −3.640612747 |
| 201109090918 | 87149 | 0.26124877 | 201109090918 | 31885 | 0.356844593 | 201109090918 | 1336 | −3.203662068 |
| 201109100928 | 88500 | 0.249590482 | 201109100928 | 9678 | −0.248821544 | 201109100928 | 2332 | −2.460609703 |
| 201109110917 | 72714 | −0.171534698 | 201109110917 | 15026 | −0.070159695 | 201109110917 | 2714 | −1.861245497 |
| 201109120830 | 65904 | −0.318922025 | 201109120830 | 15956 | −0.024732016 | 201109120830 | 2509 | −1.147871795 |

TABLE 3

| D100000 | | | D200000 | | |
|---|---|---|---|---|---|
| Scanning and termination time | Count of hits | Standardized residual | Scanning and termination time | Count of hits | Standardized residual |
| 201107052155 | 4601 | | 201107052155 | 1192 | |
| 201107062002 | 5749 | | 201107062002 | 2020 | |

TABLE 3-continued

| D100000 | | | D200000 | | |
| --- | --- | --- | --- | --- | --- |
| Scanning and termination time | Count of hits | Standardized residual | Scanning and termination time | Count of hits | Standardized residual |
| 201107070112 | 5038 | | 201107070112 | 1877 | |
| 201107091516 | 5500 | | 201107091516 | 1354 | |
| 201107101803 | 5042 | | 201107101803 | 1303 | |
| 201107112201 | 4752 | | 201107112201 | 1722 | |
| 201107121230 | 5578 | 0.792694815 | 201107121230 | 2180 | 0.874004445 |
| 201107131230 | 4950 | −0.542204571 | 201107131230 | 1478 | −0.453100915 |
| 201107141230 | 6203 | 1.797596946 | 201107141230 | 2088 | 0.619302301 |
| 201107151230 | 6146 | 1.373636277 | 201107151230 | 1708 | −0.016432209 |
| 201107161230 | 5481 | 0.069401597 | 201107161230 | 1451 | −0.500315241 |
| 201107181230 | 6216 | 1.186553433 | 201107181230 | 1475 | −0.501336091 |
| 201107191058 | 7384 | 2.746233559 | 201107191058 | 2486 | 1.109820859 |
| 201107191701 | 7380 | 2.23140408 | 201107191701 | 3003 | 1.823395203 |
| 201107201100 | 5845 | −1.043248998 | 201107201100 | 1638 | −0.655994908 |
| 201107211214 | 5912 | −0.829440034 | 201107211214 | 2346 | 0.542993743 |
| 201107220859 | 5410 | −1.610968063 | 201107220859 | 2021 | −0.117496387 |
| 201107230853 | 5358 | −1.678768011 | 201107230853 | 1583 | −0.933666183 |
| 201107240849 | 4921 | −2.175029869 | 201107240849 | 2128 | −0.126684039 |
| 201107250856 | 5560 | −0.403510072 | 201107250856 | 1622 | −0.8101433 |
| 201107261323 | 5932 | 0.736429299 | 201107261323 | 2200 | 0.427382449 |
| 201107270854 | 5879 | 0.622491627 | 201107270854 | 1679 | −0.513841507 |
| 201107280836 | 5429 | −0.12780904 | 201107280836 | 1688 | −0.329833244 |
| 201107281427 | 5430 | −0.131466298 | 201107281427 | 3462 | 2.471635129 |
| 201107290840 | 5210 | −0.523074295 | 201107290840 | 3528 | 2.093154888 |
| 201107300841 | 5499 | −0.116555936 | 201107300841 | 3653 | 1.927266718 |
| 201107310839 | 5162 | −0.668239329 | 201107310839 | 4542 | 2.770233835 |
| 201107311623 | 5174 | −0.431361503 | 201107311623 | 4543 | 2.174057273 |
| 201107311810 | 5173 | −0.234713522 | 201107311810 | 4543 | 1.443128475 |
| 201107312014 | 5161 | −0.182949246 | 201107312014 | 4542 | 0.712965314 |
| 201108010900 | 5790 | 0.954458176 | 201108010900 | 4153 | −0.158330398 |
| 201108011242 | 5647 | 0.54990911 | 201108011242 | 4153 | −0.317838254 |
| 201108011440 | 5801 | 0.768219316 | 201108011440 | 4153 | −0.445444538 |
| 201108020913 | 6404 | 1.606294189 | 201108020913 | 4511 | 0.20202975 |
| 201108030922 | 6385 | 1.228189916 | 201108030922 | 3393 | −1.501769363 |
| 201108041329 | 6515 | 1.106656399 | 201108041329 | 3702 | −0.735110804 |
| 201108051239 | 6286 | 0.33919475 | 201108051239 | 3042 | −1.531374021 |
| 201108061540 | 6289 | 0.204720165 | 201108061540 | 2788 | −1.636776812 |
| 201108071734 | 6346 | 0.12032189 | 201108071734 | 2232 | −2.139800786 |
| 201108080908 | 6378 | 0.021013252 | 201108080908 | 2632 | −1.037027274 |
| 201108090903 | 6181 | −0.304201435 | 201108090903 | 2496 | −0.765736313 |
| 201108100931 | 8228 | 3.20845478 | 201108100931 | 3315 | 0.717303927 |
| 201108110917 | 6502 | −0.186887832 | 201108110917 | 1938 | −1.292495056 |
| 201108120903 | 5603 | −1.765135579 | 201108120903 | 2309 | −0.4426372 |
| 201108130851 | 5759 | −1.308822238 | 201108130851 | 1394 | −1.721507385 |
| 201108140835 | 5333 | −1.862756251 | 201108140835 | 2489 | 0.169107329 |
| 201108150839 | 5976 | −0.483407106 | 201108150839 | 2351 | −0.005713281 |
| 201108161313 | 5369 | −1.450330012 | 201108161313 | 2574 | 0.372766959 |
| 201108170843 | 5817 | 0.110194097 | 201108170843 | 3597 | 2.128374223 |
| 201108171943 | 5819 | 0.306279423 | 201108171943 | 3597 | 1.704976571 |
| 201108180938 | 6574 | 1.51992662 | 201108180938 | 2439 | −0.39695415 |
| 201108181308 | 6574 | 1.290644639 | 201108181308 | 2439 | −0.663651285 |
| 201108181453 | 6572 | 0.938141176 | 201108181453 | 2439 | −0.650890657 |
| 201108181759 | 6575 | 0.775533833 | 201108181759 | 2439 | −0.673349363 |
| 201108190849 | 5964 | −0.595094157 | 201108190849 | 1880 | −1.494878623 |
| 201108200852 | 5709 | −1.066880515 | 201108200852 | 2448 | −0.186914206 |
| 201108210855 | 5401 | −1.555827856 | 201108210855 | 2399 | 0.031292541 |
| 201108220841 | 5781 | −0.584403709 | 201108220841 | 2682 | 0.474851987 |
| 201108230905 | 6449 | 0.766250023 | 201108230905 | 2114 | −0.456929104 |
| 201108231309 | 6447 | 0.797477384 | 201108231309 | 2113 | −0.375516294 |
| 201108231831 | 6450 | 0.838551212 | 201108231831 | 2114 | −0.290785721 |
| 201108240837 | 6310 | 0.465510835 | 201108240837 | 1870 | −0.724136664 |
| 201108241631 | 6311 | 0.298120923 | 201108241631 | 1870 | −0.576623799 |
| 201108250911 | 6008 | −0.469340727 | 201108250911 | 2016 | −0.218050139 |
| 201108260841 | 5946 | −0.63785595 | 201108260841 | 3127 | 1.653168419 |
| 201108270841 | 5634 | −1.022993412 | 201108270841 | 1760 | −0.698615407 |
| 201108271532 | 5634 | −0.794274086 | 201108271532 | 1760 | −0.60852537 |
| 201108280851 | 5548 | −0.709875811 | 201108280851 | 2332 | 0.357709417 |
| 201108281238 | 5548 | −0.495504192 | 201108281238 | 2332 | 0.23980121 |
| 201108290920 | 5732 | 0.029734407 | 201108290920 | 2260 | 0.011641173 |
| 201108291222 | 5732 | 0.107380821 | 201108291222 | 2260 | −0.050630694 |
| 201108300841 | 5939 | 0.516993783 | 201108300841 | 1994 | −0.236680657 |
| 201108301851 | 5938 | 0.429500904 | 201108301851 | 1994 | −0.296400398 |
| 201108310852 | 4934 | −1.350740048 | 201108310852 | 2789 | 0.861243817 |
| 201108311700 | 4935 | −1.176316945 | 201108311700 | 2789 | 0.744611672 |
| 201109011158 | 5025 | −0.851946241 | 201109011158 | 1852 | −0.806825536 |

TABLE 3-continued

| D100000 | | | D200000 | | |
| --- | --- | --- | --- | --- | --- |
| Scanning and termination time | Count of hits | Standardized residual | Scanning and termination time | Count of hits | Standardized residual |
| 201109021211 | 4728 | −1.154373394 | 201109021211 | 3413 | 1.687622116 |
| 201109031504 | 5440 | 0.32991094 | 201109031504 | 1821 | −1.044428438 |
| 201109041542 | 4659 | −0.848007655 | 201109041542 | 2221 | −0.387766498 |
| 201109041700 | 4659 | −0.488189675 | 201109041700 | 2221 | −0.445699751 |
| 201109050848 | 4905 | 0.004414925 | 201109050848 | 1954 | −0.709589547 |
| 201109051321 | 4902 | 0.007790856 | 201109051321 | 1954 | −0.496487052 |
| 201109051827 | 4902 | 0.042394149 | 201109051827 | 1954 | −0.522518734 |
| 201109060932 | 5122 | 0.36479556 | 201109060932 | 2462 | 0.627724316 |
| 201109061224 | 5122 | 0.454257732 | 201109061224 | 2462 | 0.464133059 |
| 201109061949 | 5122 | 0.32400306 | 201109061949 | 2462 | 0.402626829 |

TABLE 4

| D400015 | | | D500003 | | |
| --- | --- | --- | --- | --- | --- |
| Scanning and termination time | Count of hits | Standardized residual | Scanning and termination time | Count of hits | Standardized residual |
| 201109051827 | 259 | | 201108110917 | 1483 | |
| 201109061224 | 284 | | 201108120903 | 598 | |
| 201109061949 | 284 | | 201108130851 | 1009 | |
| 201109062121 | 284 | | 201108140835 | 2327 | |
| 201109071244 | 309 | | 201108150839 | 1020 | |
| 201109071502 | 309 | | 201108161313 | 1694 | |
| 201109081134 | 246 | −1.364940734 | 201108170843 | 512 | −1.245679866 |
| 201109090918 | 317 | −0.347607997 | 201108171943 | 513 | −0.961074186 |
| 201109100928 | 402 | 0.757785433 | 201108180938 | 953 | −0.167266121 |
| 201109110917 | 452 | 1.179549803 | 201108181308 | 953 | −0.150953001 |
| 201109120830 | 379 | −0.224786505 | 201108181453 | 953 | 0.249301047 |
| | | | 201108181759 | 953 | 0.268818529 |
| | | | 201108190849 | 1923 | 2.180075304 |
| | | | 201108200852 | 1798 | 1.550563661 |
| | | | 201108210855 | 565 | −0.978843834 |
| | | | 201108220841 | 414 | −1.129740193 |
| | | | 201108230905 | 1190 | 0.38359298 |
| | | | 201108231309 | 1190 | 0.314553526 |
| | | | 201108231831 | 1190 | 0.245514072 |
| | | | 201108240837 | 800 | −0.222614207 |
| | | | 201108241631 | 801 | 0.069856728 |
| | | | 201108250911 | 1113 | 0.546432873 |
| | | | 201108260841 | 2027 | 1.940330704 |
| | | | 201108270841 | 1001 | −0.096770139 |
| | | | 201108271532 | 1001 | −0.04171336 |
| | | | 201108280851 | 1228 | 0.410101799 |
| | | | 201108281238 | 1228 | 0.285422955 |
| | | | 201108291222 | 1718 | 1.017474209 |
| | | | 201108300841 | 1327 | 0.157831053 |
| | | | 201108301851 | 1324 | 0.356501548 |
| | | | 201108310852 | 607 | −0.990787369 |
| | | | 201108311700 | 605 | −0.879508587 |
| | | | 201109011158 | 1421 | 0.728207637 |
| | | | 201109021211 | 758 | −0.486828487 |
| | | | 201109031504 | 304 | −1.000691763 |
| | | | 201109041700 | 2242 | 2.684616797 |
| | | | 201109050848 | 1039 | 0.314553526 |
| | | | 201109060932 | 58 | −1.525915961 |
| | | | 201109061224 | 58 | −1.366571737 |
| | | | 201109061949 | 58 | −0.969522052 |
| | | | 201109062121 | 58 | −0.765608053 |
| | | | 201109110917 | 41 | −0.723660031 |

Second Embodiment

Figure 10:
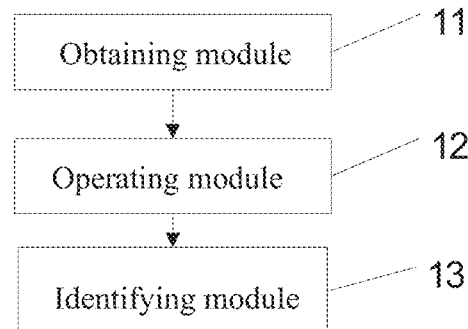
FIG. 10 is a structural diagram of a device for detecting a virus trend abnormality according to a second embodiment.

An embodiment of the technical solution of the present disclosure may be provided as a device for monitoring a virus trend abnormality, as illustrated in FIG. 10. The device may include an obtaining module 11, an operating module 12 and an identifying module 13.

The obtaining module 11 may obtain or determine a count of hits each time a virus is scanned for and terminated. The obtaining module 11 may thus determine a frequency of a virus being scanned and terminated by an anti-virus engine.

The operating module 12 may use the respective counts of hits of the virus to calculate respective M-day moving average values, where M is a positive integer. An example embodiment is described further using M=7. Additionally or alternatively, M may take the value of 4, 5, 6, 8, 9, 10, 11, etc.

The operating module 12 may calculate standardized residuals of the respective counts of hits of the virus corresponding to the M-day moving average values.

The identifying module 13 may identify a time point of occurrence of the count of hit corresponding to a standardized residual that leads to an abnormality point in a virus trend. the count of hit may be identified as an abnormality if the corresponding standardized residual is larger than a first preset threshold.

The M-day moving average calculation may be performed on the respective counts of hits for the virus to obtain the respective M-day moving average values. The standardized residuals of the respective counts of hits for the virus with respect to their corresponding M-day moving average values may be calculated next. As described earlier, the respective standardized residuals calculated in connection with the M-day moving average operation are assumed to be in a normal distribution. Therefore, a confidence interval may be used to accurately determine whether the count of hit, each time the virus is scanned for and terminated, is abnormal and further to determine whether the virus trend is abnormal. For example, the first preset threshold may be set to 1.96 corresponding to a confidence interval of 95% so that a time point for generating the count of hits corresponding to a standardized residual may be identified as an abnormality point in the development trend of the virus when the standardized residual is above the first preset threshold value of 1.96.

When the virus trend is being monitored for an abnormality, the first preset threshold may be determined for different confidence intervals. As described in this disclosure, the first preset threshold may be determined without a large amount of historical data. Thus, a new virus and a mutated virus may also be detected accurately along with a known virus for which historical data is available. Moreover, each time the virus is scanned for and terminated and the corresponding latest count of hits is obtained, such comparison of the standard residual of the latest count of hits and the first preset threshold may be performed. If the calculated standardized residual of the latest count of hits for the virus with respect to the corresponding M-day moving average value is larger than the first preset threshold, the latest count of hits for the virus may be identified as abnormal, and thus various types of viruses may be detected effectively in a timely manner.

The operating module 12 may further calculate the respective M-day moving average values as $$B_i = \frac{1}{M} \sum_{j=0}^{M} A_{i-j},$$

where $B_i$ is the M-day moving average value calculated from the i-th count of hits to the (i-M+1)-th count of hits for the virus, i∈[M ... N+1] is a positive integer, N+1 is the total number of times the count of hits of the virus is determined (such as, for example, the number of rows in Table 2), and $A_{i-j}$ is the (i-j)-th count of hits for the virus.

Particularly, the operating module 12 may further calculate a residual as $C_i = A_i - B_i$ where $C_i$ is the residual of the i-th count of hits for the virus with respect to the M-day moving average value calculated from the i-th count of hits to the (i-M+1)-th count of hits for the virus, $A_i$ is the i-th count of hits for the virus, $B_i$ is the M-day moving average value calculated from the i-th count of hits to the (i-M+1)-th count of hits for the virus, i∈[M N+1] and i is a positive integer, and N+1 is the total number of times counts of hits of a virus have been determined and/or stored, such as, for example, the number of rows in Table 1.

The operating module 12 may also calculate the average of the residuals as $$E = \frac{1}{N - \max(M, N-L)} \sum_{i=\max(M,N-L)}^{N} Ci,$$

where E is the average of the residuals corresponding to the respective counts of hits for the virus, and L∈[1 ... N] and L is a positive integer.

The operating module 12 may also calculate a standard deviation of the residuals as $$S = \frac{1}{N - \max(M, N-L) - 1} \sum_{i=\max(M,N-L)}^{N} (Ci - E)^2,$$

where S is the standard deviation of the residuals corresponding to the respective counts of hits for the virus.

The operating module 12 may further calculate a standardized residual of the (N+1)-th count of hits for the virus with respect to a corresponding M-day moving average value as $$D_{N+1} = \frac{C_{N+1} - E}{S},$$

where $D_{N+1}$ is the standardized residual of the (N+1)-th count of hits for the virus with respect to the corresponding M-day moving average value, and $C_{N+1}$ is a residual of the (N+1)-th count of hits for the virus with respect to the M-day moving average value calculated from the (N+1)-th count of hits to the (N-M+2)-th count of hits for the virus.

The identifying module 13 may identify the time point of the occurrence of the (N+1)-th count of hit for the virus, as an abnormality point in the virus trend if $D_{N+1} > \omega_1$, where $\omega_1$ is the first preset threshold.

Figure 11:
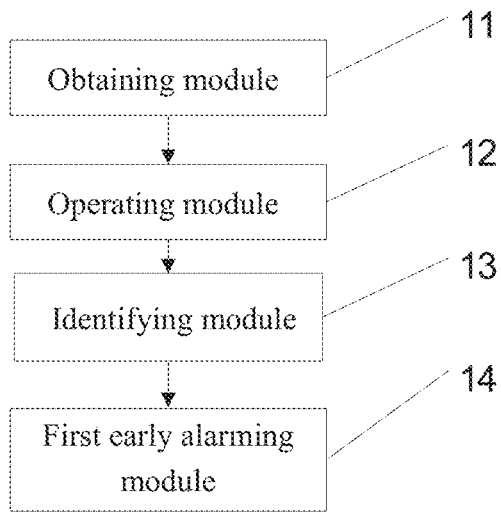
FIG. 11 is another structural diagram of a device for detecting a virus trend abnormality according to the second embodiment.
Figure 12:
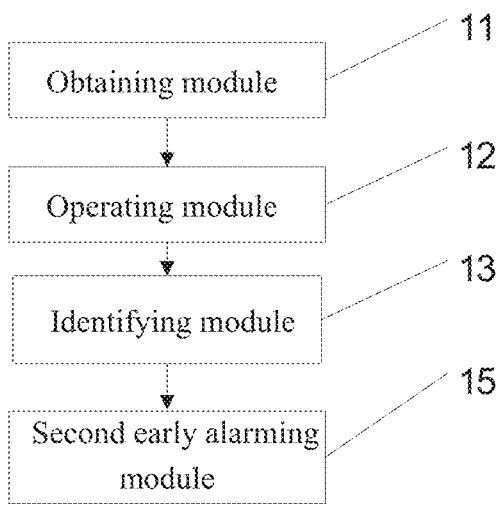
FIG. 12 is still another structural diagram of a device for detecting a virus trend abnormality according to the second embodiment.

Alternatively, or in addition, as illustrated in FIG. 11, the apparatus may further include a first early alarming module 14.

The first early alarming module 14 may issue a first-level early alarm at the time point of the occurrence of the (N+1)-th count of hits for the virus, if $\omega_2 \geq D_{N+1} > \omega_1$, where $\omega_1$ is the first preset threshold, and $\omega_2$ is a second preset threshold.

The first early alarming module 14 may issue a second-level early alarm at the time point of the occurrence of the (N+1)-th count of hits for the virus, if $D_{N+1} > \omega_2$.

Alternatively, or in addition, as illustrated in FIG. 11, the apparatus may further include a second early alarming module 15.

The second early alarming module 15 may issue a first-level early alarm for the time point of the occurrence of the (N+1)-th count of hits for the virus, if $\omega_2 \geq D_{N+1} > \omega_1$ and $C_{N+1} > \lambda$, where $\omega_1$ is the first preset threshold, $\omega_2$ is the second preset threshold, and $\lambda$ is a preset variation threshold.

The second early alarming module 15 may also issue a second-level early alarm at the time point of the occurrence of the (N+1)-th count of hits for the virus, if $D_{N+1} > \omega_2$ and $C_{N+1} > \lambda$.

Reference can be made to the relevant description of the method in the first embodiment above for an implementation of the functions of the device described here.

Various embodiments described herein can be used alone or in combination with one another. The foregoing detailed description has described only a few of the many possible implementations of the present disclosure. For this reason, this description of example embodiments is intended by way of illustration, and not by way of limitation. Some modifications and equivalents can be made to the technical solution of the present invention by those skilled in the art in light of the technical content disclosed above without deviation from the scope of the present disclosure. Therefore, any simple change, equivalent alternation and modification made to the above embodiments according to the technical principle of the present disclosure without deviation from the scope of the present disclosure all fall within the scope of protection of the technical solution of the present disclosure.

What is claimed is:

1. A method for monitoring a virus trend abnormality, the method performed on a computer device including a memory having code stored therein, the code configuring the computer device to perform the method comprising:
   determining and storing counts of hits of a virus during scanning of a respective location on the memory to locate a file that has been infected by the virus during an execution of an anti-virus operation and quarantining the file;
   in response to the scanning and quarantining:
      calculating moving average values of the counts of hits of the virus for a predetermined number of days;
      calculating standardized residuals corresponding to respective counts of hits of the virus based on the calculated moving average values;
      determining whether the standardized residuals corresponding to the respective counts of hits are larger than a first preset threshold;
      identifying a time point of occurrence of the count of hits as an abnormality point on a trend of the virus in a case that a standardized residual corresponding to a respective count of hits is larger than the first preset threshold; and
      issuing by the computer device, an alarm for the abnormality point to indicate a computer virus breakout or a variant of the virus;
   wherein calculating standardized residuals comprises configuring the computer device to:
      calculate a residual as $C_i = A_i - B_i$, wherein $C_i$ is the residual of the i-th count of hits of the virus with respect to a M-day moving average value calculated from the i-th count of hits to the (i-M+1)-th count of hits of the virus, $A_i$ is the i-th count of hits of the virus, and $B_i$ is a moving average value calculated from the i-th count of hits to the (i-M+1)-th count of hits for the virus, $i \in [M \ldots N+1]$ and i is a positive integer;
      calculate an average of the calculated residuals as $$E = \frac{1}{N - \max(M, N - L)} \sum_{i=\max(M,N-L)}^{N} C_i,$$

wherein E is the average of the residuals corresponding to the respective counts of hits of the virus, and $L \in [1 \ldots N]$ and L is a positive integer;
calculate a standard deviation of the calculated residuals as $$S = \frac{1}{N - \max(M, N - L) - 1} \sum_{i=\max(M,N-L)}^{N} (Ci - E)^2,$$

wherein S is the standard deviation of the residuals corresponding to the respective counts of hits of the virus; and
calculate a standardized residual of the (N+1)-th count of hits of the virus with respect to a corresponding M-day moving average value as $$D_{N+1} = \frac{C_{N+1} - E}{S},$$

wherein $D_{N+1}$ is the standardized residual of the (N+1)-th count of hits of the virus with respect to the corresponding M-day moving average value, and $C_{N+1}$ is a residual of the (N+1)-th count of hits of the virus with respect to the M-day moving average value calculated from the (N+1)-th count of hits to the (N-M+2)-th count of hits of the virus.

2. The method according to claim 1, wherein calculating the moving average values comprises:
   calculating the moving average values as $$B_i = \frac{1}{M} \sum_{j=0}^{M} A_{i-j},$$

wherein M is the predetermined number of days, $j \in [0 \ldots M]$ and j is an integer, N+1 is a total number of times the count of hits of the virus has been determined, and $A_{i-j}$ is the (i-j)-th count of hits of the virus.

3. The method according to claim 1, wherein the identifying the abnormality point comprises:
   identifying the time point of the occurrence of the (N+1)-th count of hit of the virus, as the abnormality point on the trend of the virus if $D_{N+1} > \omega_1$, wherein $\omega_1$ is the first preset threshold.

4. The method according to claim 2, further comprising:
   issuing a first-level early alarm for a time point of the occurrence of the (N+1) count of hits of the virus, if $\omega_2 \geq D_{N+1} > \omega_1$, wherein $\omega_1$ is the first preset threshold, $\omega_2$ is a second preset threshold, and $D_{N+1}$ is the standardized residual of the (N+1)-th count of hits of the virus; and
   issuing a second-level early alarm for the time point of the occurrence of the (N+1) count of hits of the virus, if $D_{N+1} > \omega_2$.

5. The method according to claim 2, further comprising:
   issuing a first-level early alarm for a time point of the occurrence of the (N+1) count of hits of the virus, if $\omega_2 \geq D_{N+1} > \omega_1$ and $C_{N+1} > \lambda$, wherein $\omega_1$ is a first preset threshold, $\omega_2$ is a second preset threshold, $D_{N+1}$ is the standardized residual of the (N+1)-th count of hits of the virus, $C_{N+1}$ is the residual of the (N+1)-th count of hits of the virus, and $\lambda$ is a preset variation threshold; and issuing a second-level early alarm for the time point of the occurrence of the (N+1)-th count of hits of the virus, with $D_{N+1}>\omega_2$ and $C_{N+1}>\lambda$.

6. The method according to claim 1, wherein the count of hits is stored in a database in the format of "virus engine ID-virus ID-date-time of day-count of hits" in a chronological order from an earliest scanning and terminating time to a latest.

7. A computer device for monitoring a virus trend abnormality, the computer device including a memory having code stored therein, the code configuring the computer device to:
  scan a respective location on the memory to locate a file that has been infected by a virus and obtain counts of hits of the virus during an execution of an anti-virus operation and quarantine the file;
  in response to the scanning and quarantining, configuring the computer device to:
    calculate moving average values of the counts of hits of the virus over a predetermined number of days; and
    calculate standardized residuals corresponding to respective counts of hits of the virus over the predetermined number of days based on corresponding calculated moving average values;
    determine whether the standardized residuals corresponding to the respective counts of hits is larger than a first preset threshold;
    identify a time point of occurrence of the count of hits as an abnormality point in a virus trend, wherein the abnormality point indicates an occurrence of an abnormal count of hits of the virus in a case that a standardized residual corresponding to a respective count of hits is larger than the first preset threshold;
    issue by the computer device, an alarm for the abnormality point to inform a computer virus breakout or a variant of the virus;
  wherein configuring the computer device to calculate standardized residuals comprises configuring the computer device to:
    calculate a residual as $C_i=A_i-B_i$, wherein $C_i$ is the residual of the i-th count of hits of the virus with respect to a M-day moving average value calculated from the i-th count of hits to the (i-M+1)-th count of hits for the virus, $A_i$ is the i-th count of hits for the virus, and $B_i$ is a moving average value calculated from the i-th count of hits to the (i-M+1)-th count of hits for the virus, $i \in [M \ldots N+1]$ and i is a positive integer;
    calculate an average of the residuals as $$E = \frac{1}{N - \max(M, N-L)} \sum_{i=\max(M,N-L)}^{N} C_i,$$

wherein E is the average of the residuals corresponding to the respective counts of hits of the virus, and $L \in [1 \ldots N]$ and L is a positive integer;
    calculate a standard deviation of the residuals as $$S = \frac{1}{N - \max(M, N-L) - 1} \sum_{i=\max(M,N-L)}^{N} (C_i - E)^2,$$

wherein S is the standard deviation of the residuals corresponding to the respective counts of hits of the virus; and
    calculate a standardized residual of the (N+1)-th count of hits of the virus with respect to a corresponding M-day moving average value as $$D_{N+1} = \frac{C_{N+1} - E}{S},$$

wherein $D_{N+1}$ is the standardized residual of the (N+1)-th count of hits of the virus with respect to the corresponding M-day moving average value, and $C_{N+1}$ is a residual of the (N+1)-th count of hits of the virus with respect to the M-day moving average value calculated from the (N+1)-th count of hits to the (N-M+2)-th count of hits of the virus.

8. The computer device according to claim 7, wherein the calculation of the moving average values comprises calculation of the moving average values as $$B_i = \frac{1}{M} \sum_{j=0}^{M} A_{i-j},$$

wherein M is the predetermined number of days, $j \in [0 \ldots M]$ and j is an integer, N+1 is the number of counts of hits of the virus has been obtained, and $A_{i-j}$ is the (i-j)-th count of hits of the virus.

9. The computer device according to claim 7, wherein the computer device is further configured to identify a time point of occurrence of the (N+1)-th count of hits of the virus, as the abnormality point in virus trend if $D_{N+1}>\omega_1$, wherein $\omega_1$ is the first preset threshold.

10. The computer device according to claim 8, wherein the computer device is further configured to:
  issue a first-level early alarm for a time point of occurrence of the (N+1)-th count of hits of the virus, if $\omega_2 \geq D_{N+1}>\omega_1$, wherein $\omega_1$ is a first preset threshold, $\omega_2$ is a second preset threshold, and $D_{N+1}$ is the standardized residual of the (N+1)-th count of hits of the virus; and
  issue a second-level early alarm for the time point of occurrence the (N+1)-th count of hits of the virus, if $D_{N+1}>\omega_2$.

11. The computer device according to claim 8, wherein the computer device is further configured to:
  issue a first-level early alarm for a time point of occurrence of the (N+1)-th count of hits of the virus, with $\omega_2 \geq D_{N+1}>\omega_1$ and $C_{N+1}>\lambda$, wherein $\omega_1$ is a first preset threshold, $\omega_2$ is a second preset threshold, $D_{N+1}$ is the standardized residual of the (N+1)-th count of hits of the virus, $C_{N+1}$ is the residual of the (N+1)-th count of hits of the virus, and $\lambda$ is a preset variation threshold; and
  issue a second-level early alarm for the time point of occurrence of the (N+1)-th count of hits of the virus, with $D_{N+1}>\omega_2$ and $C_{N+1}>\lambda$.

12. The computer device according to claim 7, wherein the count of hits is stored in a database in the format of "virus engine ID-virus ID-date-time of day-count of hits" in a chronological order from an earliest to a latest hit of the virus.

* * * * *